(12) United States Patent
Luettgen et al.

(10) Patent No.: US 11,974,703 B2
(45) Date of Patent: May 7, 2024

(54) LINER TOILET

(71) Applicant: Kohler Co., Kohler, WI (US)

(72) Inventors: Michael Luettgen, Kohler, WI (US); Yogesh Pansare, Kohler, WI (US); Swapnil Borade, Kohler, WI (US)

(73) Assignee: Kohler Co., Kohler, WI (US)

( * ) Notice: Subject to any disclaimer, the term of this patent is extended or adjusted under 35 U.S.C. 154(b) by 436 days.

(21) Appl. No.: 17/121,334

(22) Filed: Dec. 14, 2020

(65) Prior Publication Data
US 2021/0204766 A1    Jul. 8, 2021

(30) Foreign Application Priority Data

Jan. 4, 2020  (IN) ............................. 202021000378
Apr. 21, 2020  (IN) ............................. 202021017122

(51) Int. Cl.
A47K 11/02    (2006.01)

(52) U.S. Cl.
CPC ................. A47K 11/026 (2013.01)

(58) Field of Classification Search
CPC ........ A47K 11/02; A47K 11/026; B09B 3/00; B65B 2220/08; B65B 15/306; B65D 31/10; B65D 31/14–147; B65F 2210/167; Y02A 50/30
See application file for complete search history.

(56) References Cited

U.S. PATENT DOCUMENTS

| | | |
|---|---|---|
| 589,601 A | 9/1897 | Howell |
| 1,189,504 A | 7/1916 | Stickdorn |
| 2,671,906 A | 3/1954 | Potts |
| 3,184,761 A | 5/1965 | Broughton |
| 3,217,337 A | 11/1965 | Obrien |
| 3,452,368 A | 7/1969 | Couper |
| 3,495,278 A | 2/1970 | Peters |
| 3,514,231 A | 5/1970 | Belden et al. |
| 3,619,822 A | 11/1971 | Carmichael |
| 3,648,302 A | 3/1972 | Winters |
| 3,665,522 A * | 5/1972 | Backlund ............. A47K 11/026 4/484 |

(Continued)

FOREIGN PATENT DOCUMENTS

| | | |
|---|---|---|
| CA | 1048705 A | 2/1979 |
| CH | 525134 A | 7/1972 |

(Continued)

OTHER PUBLICATIONS

Chinese Office Action from Chinese Patent Application No. 202110003219.7, dated Apr. 6, 2022, 27 pages (including English Summary).

(Continued)

*Primary Examiner* — David P Angwin
*Assistant Examiner* — Nicholas A Ros
(74) *Attorney, Agent, or Firm* — Lempia Summerfield Katz LLC

(57) ABSTRACT

An apparatus for a portable toilet includes a film storage compartment and a plurality of transport wheels. The film storage compartment is configured to store a liner having a tubular shape. The plurality of transport wheels is configured to transport the liner through a serpentine space. At least one of the plurality of transport wheels includes a high friction area and a hollow area.

22 Claims, 27 Drawing Sheets

(56) References Cited

U.S. PATENT DOCUMENTS

| | | | |
|---|---|---|---|
| 3,693,193 A | 9/1972 | May | |
| 3,723,999 A | 4/1973 | Miller | |
| 3,908,336 A | 9/1975 | Forslund | |
| 4,025,969 A | 5/1977 | Dahlen | |
| 4,519,104 A * | 5/1985 | Nilsson | B65F 1/062 4/484 |
| 5,088,134 A | 2/1992 | Douglas | |
| 5,960,487 A | 10/1999 | Hawkins | |
| 6,052,842 A * | 4/2000 | He | A47K 11/026 4/484 |
| 6,101,641 A | 8/2000 | Hawkins | |
| 6,212,701 B1 | 4/2001 | He | |
| 6,719,194 B2 * | 4/2004 | Richards | B65F 1/062 53/567 |
| 7,849,527 B2 | 12/2010 | Mochizuki | |
| 9,079,710 B2 * | 7/2015 | Nakano | B65F 1/062 |
| 9,149,163 B2 * | 10/2015 | Natt | A47K 11/026 |
| 9,345,369 B2 | 5/2016 | Livingston | |
| 9,357,890 B2 | 6/2016 | Morris | |
| 9,364,124 B2 * | 6/2016 | Morris | A47K 11/026 |
| 9,404,247 B2 | 8/2016 | Mehta et al. | |
| 9,598,194 B2 | 3/2017 | Shimanuki | |
| 10,040,408 B2 | 8/2018 | Morris | |
| 10,743,728 B2 * | 8/2020 | Nelson | E04H 1/1216 |
| 2009/0165196 A1 | 7/2009 | Mochizuki et al. | |
| 2009/0255045 A1 | 10/2009 | Sakurai | |
| 2010/0269250 A1 | 10/2010 | Wilson | |
| 2013/0125301 A1 | 5/2013 | Natt et al. | |
| 2017/0071422 A1 | 3/2017 | Costa | |
| 2018/0142455 A1 | 5/2018 | Hall et al. | |
| 2021/0085134 A1 * | 3/2021 | Welfare | A47K 11/026 |

FOREIGN PATENT DOCUMENTS

| | | |
|---|---|---|
| CH | 701336 A1 | 12/2010 |
| CN | 2255809 Y | 6/1997 |
| CN | 201258526 Y | 6/2009 |
| CN | 201441329 U | 4/2010 |
| CN | 101328721 B | 11/2010 |
| CN | 201658312 U | 12/2010 |
| CN | 103037742 A | 4/2013 |
| CN | 103371767 A | 10/2013 |
| CN | 204238321 U | 4/2015 |
| CN | 105962828 A | 9/2016 |
| CN | 108024799 A | 5/2018 |
| CN | 110042894 A | 7/2019 |
| DE | 1958126 A1 | 5/1971 |
| DE | 20310570 U1 | 11/2003 |
| DE | 202008000711 U1 | 5/2009 |
| DE | 202010009966 U1 | 10/2011 |
| DE | 202011001413 U1 | 4/2012 |
| DE | 202011001414 U1 | 4/2012 |
| DE | 202011104936 U1 | 12/2012 |
| DE | 202015105523 U1 | 10/2015 |
| EP | 0668737 A1 | 8/1995 |
| EP | 1206920 A1 | 5/2002 |
| EP | 2547245 B1 | 4/2017 |
| FR | 2067921 A5 | 8/1971 |
| FR | 2775179 A1 | 8/1999 |
| FR | 3012734 A1 | 5/2015 |
| GB | 272826 A | 6/1927 |
| GB | 355622 A | 8/1931 |
| GB | 753370 A | 7/1956 |
| GB | 1265328 A | 3/1972 |
| GB | 1294129 A | 10/1972 |
| GB | 1516206 A | 6/1978 |
| GB | 2160417 B | 8/1987 |
| GB | 2539205 A | 12/2016 |
| KR | 101058950 B1 | 8/2011 |
| KR | 101988215 * | 6/2019 | ........... A47K 11/026 |
| WO | 9942027 A1 | 8/1999 |
| WO | WO2004004530 * | 1/2004 | ........... A47K 11/026 |
| WO | 2009129638 A2 | 10/2009 |
| WO | 2015119517 A1 | 8/2015 |

OTHER PUBLICATIONS

Chinese Office Action from Chinese Patent Application No. 202110003219.7, 21 pages. (including English summary).

* cited by examiner

LINER TOILET

CROSS REFERENCE TO RELATED APPLICATION

This application claims the benefit of priority to India Application No. 202021000378 filed Jan. 4, 2020 and India Application No. 202021017122 filed Apr. 21, 2020, which are hereby incorporated by reference in their entirety.

FIELD

This disclosure relates in general to a portable toilet system having a liner transport system.

BACKGROUND

Sanitation in the developing world is a complex issue with many facets requiring many different approaches depending on local circumstances. In many circumstances, approaches such as the installation of sewer networks, decentralized treatment, septic tanks, or pit latrines is appropriate and practical. In some circumstances, the requisite infrastructure is not available and these approaches are not feasible or practical.

BRIEF DESCRIPTION OF THE DRAWINGS

Exemplary embodiments are described herein with reference to the following drawings.

DETAILED DESCRIPTION

Figure 1:
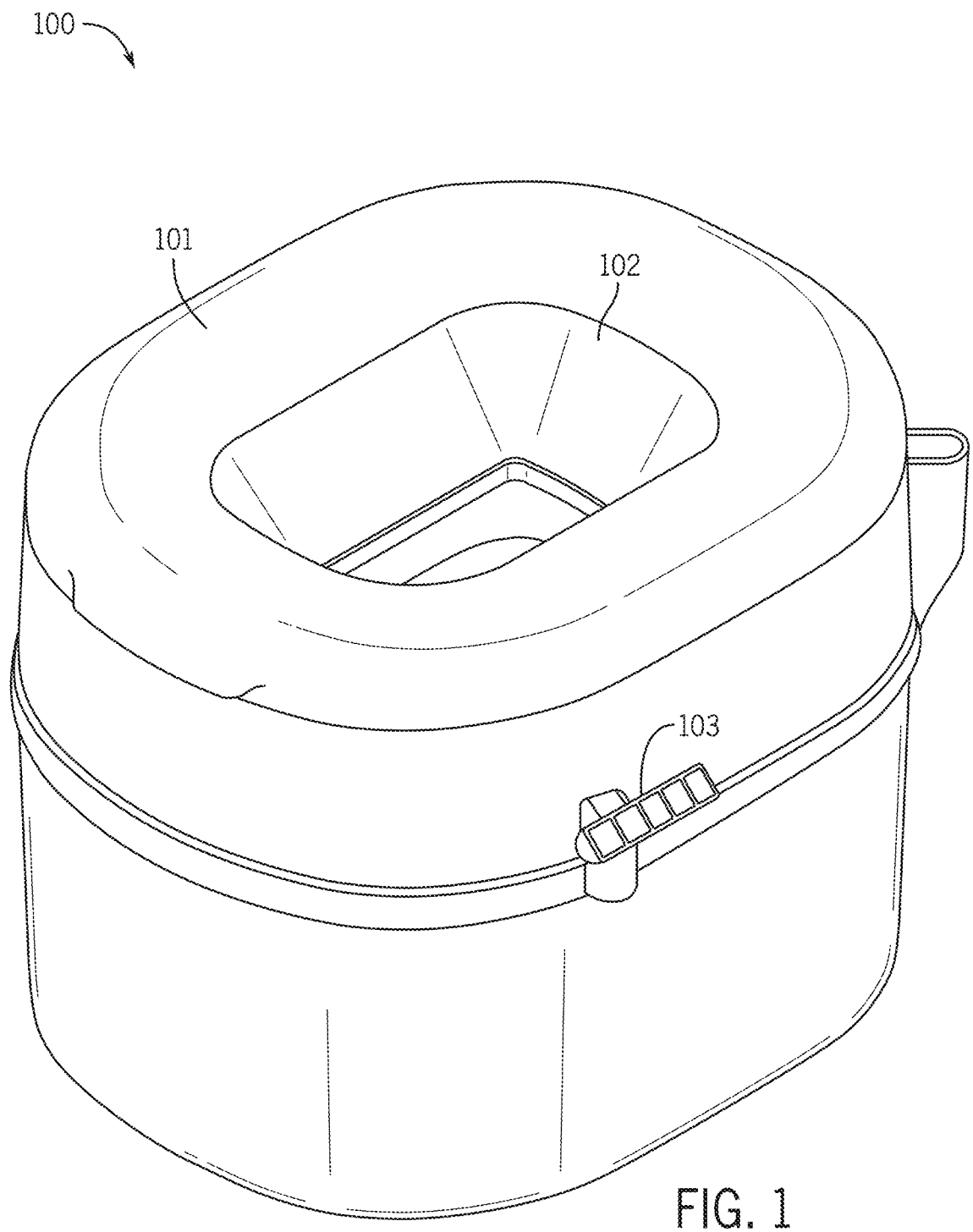
FIG. 1 illustrates an example portable toilet.

When the installation of sewer networks, decentralized treatment, septic tanks, or pit latrines is not appropriate or feasible, an approach known as container based sanitation (CBS) may be used. CBS is the practice of storing human excrement waste from a toilet system in containers until these containers can be collected and transported to a location where the waste can be safely dispositioned. One approach to CBS is to first wrap the waste in an airtight plastic film prior to depositing that waste into a container suitable for waste accumulation. By first wrapping the waste in a film, odors are minimized and surfaces within the toilet system are kept clean. One approach may use a plastic film in the shape of a long tube. With one end of the tube knotted closed, the waste is captured in the tube, then an appropriate length of tube with waste encapsulated, is transported via a transport mechanism consisting of a pair of opposing ribbed conveyer belts driven by a set of motivated rollers, and into a container for storage. With the plastic tube always squeezed between the opposing ribbed conveyer belts, the tube configuration of plastic liner is kept sealed thus minimizing odor.

There are several disadvantages of this approach. One disadvantage is the transport mechanism is relatively long consisting of vertical conveyer belts to transport the waste from the toilet bowl above and a waste container below. This configuration makes for a relatively tall toilet unit and becomes tall enough to require that a step be placed in front of the toilet for users to step up to and sit on the toilet seat. The tall toilet unit can be an inconvenience for users. The tall toilet unit may also be an issue for households or other locations with limited space and low ceilings. An additional disadvantage is that ribs on the opposing conveyer belts of the transport mechanism are used to seal the plastic film liner. In order to seal the plastic film liner, the generally horizontal ribs on the conveyer belts must be synchronized to meet with each rotation of the transport mechanism and must be continuous to provide an airtight seal on the plastic film liner. As the transport mechanism rotates, and the waste is pulled down into the container, a volume of air is also ingested into the plastic film liner. Since the opposing ribs seal the plastic film liner, and the system is continuous, meaning that a second set of ribs seals the plastic film liner before the first set of ribs unseals on its travel back to the top of the transport mechanism, the air that gets ingested into the plastic film liner during the transport process is never allowed to escape. The effect of this is that the plastic film liner fills with air and the system capacity to store waste is reduced, perhaps significantly. To allow this air to escape from the plastic film liner, gaps are left in the conveyer belt ribs such that those ribs do not create a continuous seal. This gap provides a continuous venting of air from the plastic film liner, and with that air, waste odors are also allowed to continuously vent. To mitigate continuous odor leakage from this approach in confined spaces such as a small home, an exhaust fan has been implemented thus adding complexity to the system.

The following embodiments include a CBS toilet utilizing the plastic film liner in a tube configuration approach that solves the issues of toilet height and continuous odor. To solve to issue of system height, the transport mechanism is a low-profile system of significantly shorter vertical height. To solve the issue of continuous odor, in some examples, a pinching system closes the liner upstream of the transport mechanism. With this system, the transport mechanism and the pinching system share only two horizontally opposed shafts. In this way, the height of the portable toiler can be kept short to only the diameter of the transport wheels, or less than twice the diameter of the transport wheels.

FIG. 1 illustrates an example portable toilet 100. The exterior of the portable toilet 100 includes a seat 101, a bowl 102, and a handle 103. Additional, different, or fewer components may be included. The portable toilet 100 is a CBS toilet with a liner. The handle 103 provides a user input to the portable toilet 100 that performs multiple simultaneous or sequential operations to flush the portable toilet 100. The handle 103 causes the liner of the portable toilet 100 to be advanced. The handle 103 causes the liner to be pushed close. The handle 103 causes the liner with deposited material to be deposited into a receptacle.

Figure 2:
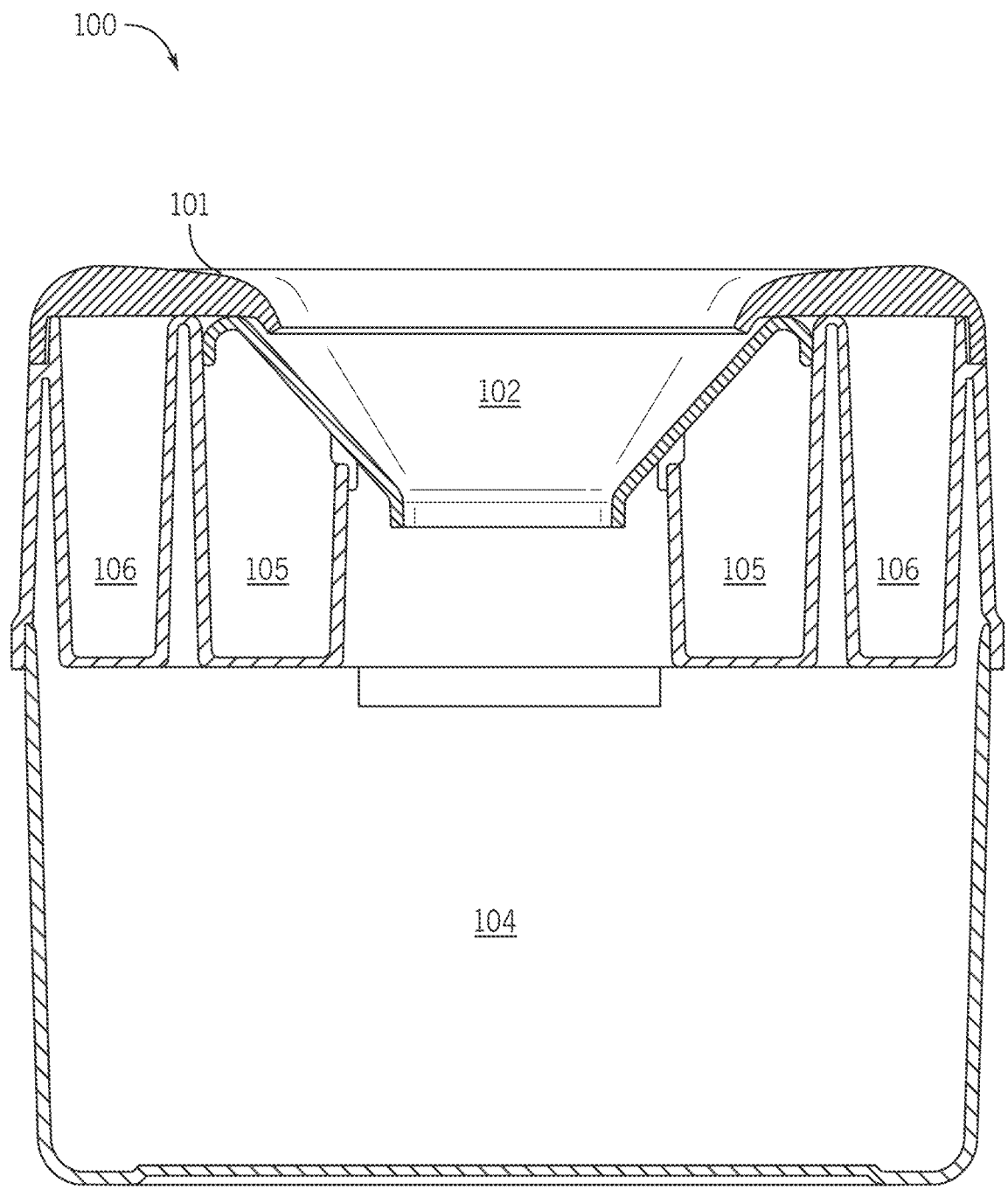
FIG. 2 illustrates a cross section of the portable toilet of FIG. 1.

FIG. 2 illustrates a cross section of the portable toilet 100 of FIG. 1. The portable toilet 100 include multiple cavities, such as an inner storage cavity 105, an outer storage cavity 106, and a waste cavity 104. Additional, different, or fewer components may be included.

The inner storage cavity 105 may store the liner. The liner may be a plastic layer having a tubular shape, effectively comprising two layers of film when it is folded together. The inner storage cavity 105 may be shaped as a hollow cylinder or a torus. That is, the inner storage cavity 105 may extend fully around the portable toilet 100, enclosing the tubular shape of the liner. The layers of the liner may be rolled, stacked, or otherwise folded in the storage cavity 105. The location of the plastic film liner is just beneath the toilet bowl 102 and around its periphery. This storage cavity 105 has a continuous surface to allow easy, low friction dispensing of the plastic film liner that is compactly stored within it. It also prevents the potential of other material from becoming entangled in it. The bowl 102 may be removable to allow the liner to be installed in the inner storage cavity 105.

The outer storage cavity 106 may store cleaning material. The outer storage cavity 106 may include a hygiene liquid, cleaning cloths, cleaning solution, hygiene paper, or other materials. The bowl 102 and/or seat 101 may be removable to allow materials to be installed in the outer storage cavity 106. In one alternative, the portable toilet 100 is adjustable such that either the inner storage cavity 105 or the outer storage cavity 106, or both, may be a film storage compartment configured to store a liner.

The hygiene liquid may be water and the outer storage cavity 106 may be a water reservoir that contains sufficient water to manage the personal hygiene for a significant number of uses. A hand pump spray head (squirt bottle spray head) may be connected to the reservoir via a flexible plastic tube of sufficient length. This spray head can then be used to wash the desired location with the wash water then falling into to the toilet bowl where it can be transported into the waste container in the plastic film liner with the other waste material. Alternatively, the hygiene liquid may include a cleaning liquid.

The waste cavity 104 receives and houses the liner after waste has been deposited into the liner. The waste cavity 104 may be detachable from the portable toilet 100. The waste cavity 104 may snap into place by coupling to the portable toilet 100. Multiple waste cavities may be used.

Figure 3:
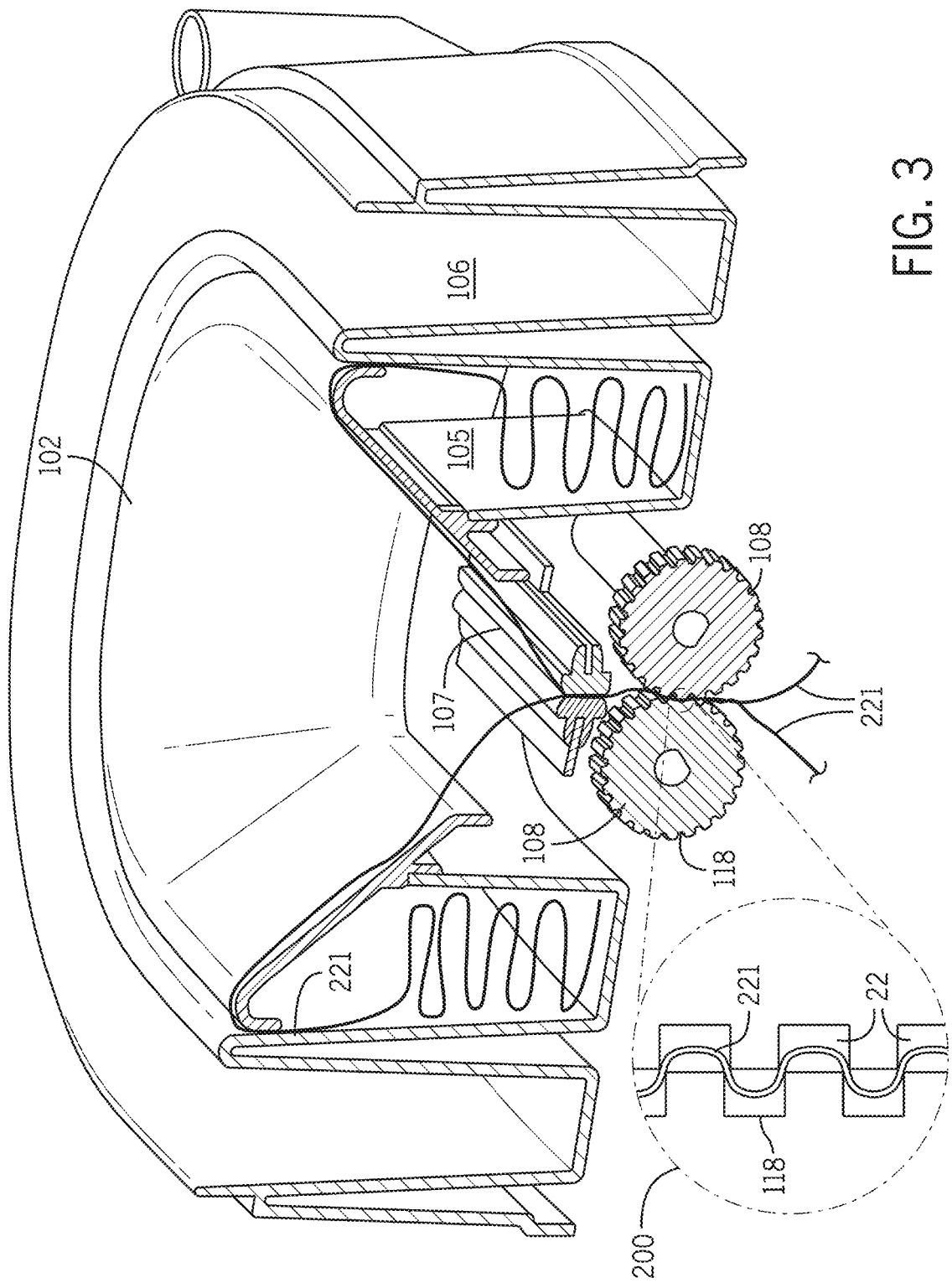
FIG. 3 illustrates another cross section of the portable toilet of FIG. 1 including a liner pinching system and a liner transport system.

FIG. 3 illustrates another cross section of the portable toilet 100 of FIG. 1 including the inner storage cavity 105, the outer storage cavity 106, the bowl 102, the waste cavity 104, a liner pinching system 107, and a liner transport system 108. Additional, different, or fewer components may be included.

The liner pinching system 107 may include at least one pinching arm. The liner pinching system 107 may include two (a pair of) pinching arms that are configured to oppose each other and come together with a predetermined range of force to press the two sides of the tubular liner together. The liner pinching system 107 may include multiple pinch arms configured to open to release the liner and close to pinch together the liner.

The liner transport system 108 may include at least one transport wheel. The liner transport system 108 may include two (a pair of) transport wheels that are configured to oppose each other and come together with a predetermined range of force to press the two sides of the liner of for the purpose of advancing the liner.

The transport wheels may be formed of a compliant material. Examples of the material for the transport wheels may include elastomer. The inverse of stiffness is compliance. Compliance may be measured based on amount of force that causes a threshold level of displacement in the material. The transport wheels may have a predetermined stiffness. The transport wheels may have a predetermined modulus of elasticity. The transport wheels include teeth 118. In some example, the teeth 118 are formed from a different material that the rest of the transport wheels. In another example, the teeth 118 and transport wheels are formed integrally. In either case, the teeth 118 are compliant. As the two opposing wheels moving together to form a serpentine space between the teeth 118. A serpentine space may be curved to follow the outer surface of the meshing teeth 118. The transport wheels are similar to gears in that they have teeth that interlock with the teeth on the opposing transport wheels but are designed to be in intimate and forceful contact with each other such that when the plastic film or liner is squeezed between them and is formed into the serpentine space between the transport wheels to increase the area of friction between the transport wheels and the plastic film liner. The contact force between the plastic film liner and transport wheels is great, causing enough friction between the transport wheels and the plastic film such that the plastic film and waste can be reliably pulled down into the waste cavity 104.

FIG. 3 includes a window 200 that is an exploded view of the interaction of the transport wheels. In this example, the teeth 118 in the opposing transport wheels become partially interlocked to form the serpentine space 22. The teeth 118 push the liner 221 to conform substantially to the serpentine space 22. In other examples, the opposing transport wheels may not be interlocked, and respective teeth of the opposing transport wheels press against one another. The respective teeth of the opposing transport wheels may apply a force to each other sufficient to deform the respective teeth of the opposing transport wheels.

The transport wheels and the pinching system 107 are arranged vertically. The pinching system 107 is above the transport wheels. A hypothetical line drawn in the direction of gravity would intersect both a space between the transport wheels and the space between the pinching arms of the pinching system 107. The transport wheels advance the liner through the serpentine space 22.

Figure 4:
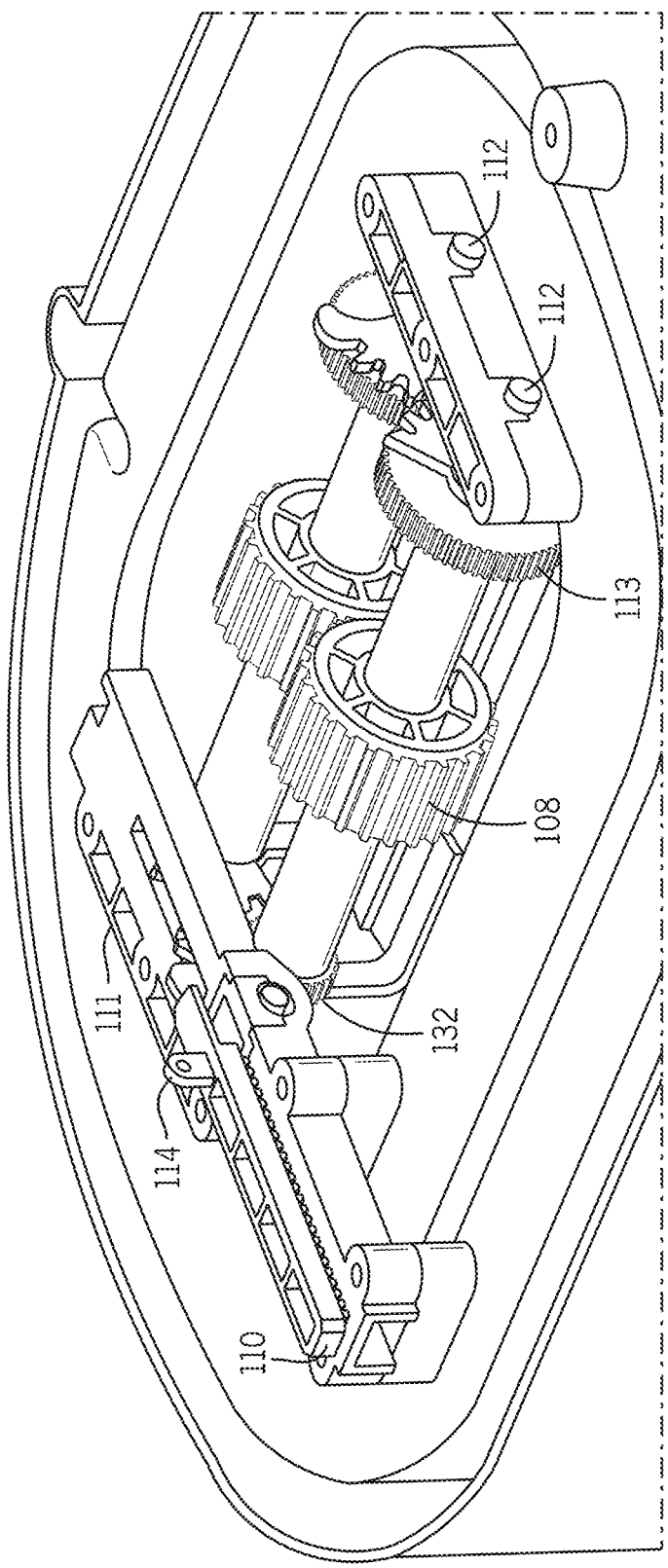
FIG. 4 illustrates an example drive mechanism for the liner pinching system and the liner transport system.

FIG. 4 illustrates an example drive mechanism for the liner pinching system and the liner transport system. The view of FIG. 4 is from underneath the potable toilet 100. A pair of drive shafts support the transport wheels. The drive shafts may be inside a spacer, which also may be surrounded by a sleeve. In the following examples, the terms "drive shaft 112" or "drive shaft assembly" are understood to optionally include the spacer and/or the sleeve.

As shown in FIG. 4, the width of the transport wheels, in the direction of the rotation axis, is less than the entire width of the opening of the portable toilet 100. The width of at least one of the transport wheel is smaller than a width of at least one of the shafts 112 that support the transport wheel. In addition, the width of the transport wheels is less than a width of the liner.

In other embodiments, rather than a single pair of the transport wheels, there may be more than one pair or more opposing wheels located on the drive shaft 112 of the transport system. Even in this example, the wheels are in discrete locations (not a continuous roller) so as the wheels pull the plastic film and waste down into the waste cavity 104 of the container, the waste is able to be squeezed to the sides of the wheels, and can be pulled down with the plastic film without ingesting air into the plastic film liner.

In addition, the transport wheels may be configured to separate in certain scenarios (e.g., pivot away from one another about a pivot axis that is different than the rotation axis of the transport wheels). The drive shafts 112 that support the transport wheels are mounted to are attached to the portable toilet 100 in an adjustable manner which allows the shafts 112 and transport wheels to be separated when required. Since the transport wheels are also compliant, when a ridged object is dropped into the toilet bowl 102, and this transport mechanism is operated, the ridged object will be allowed through the system by displacing the transport wheels and drive shafts 112, without damage to the portable toilet 100.

Each of the drive shafts 112 includes at least one additional gear. As shown in FIG. 4, one of the drive shafts 112 includes a driven gear 113 and a drive gear 132. The other of the drive shafts 112 includes a follower gear 114 meshed with the driven gear 113.

A drive rack 110 is configured to move in a horizontal direction along a depth of the portable toilet 100. The drive rack 110 moves in a direction perpendicular to the rotation axis of the transport wheels and/or perpendicular to the direction of gravity. The motion of the drive rack 110 may be caused by a force from the user (e.g., through a pull cord described below). The motion of the drive rack 110 drives the pinch arms of the pinch arm system 107 and the transport wheels of the liner transport system 108.

As an alternative to the drive rack 110, a rotary drive system may be used. The rotary drive system may be driven by a crank with a handle. The rotary drive system may include the same sequence of actuation points on a round gear or cam that is described herein with respect to the linear rack.

Figure 5:
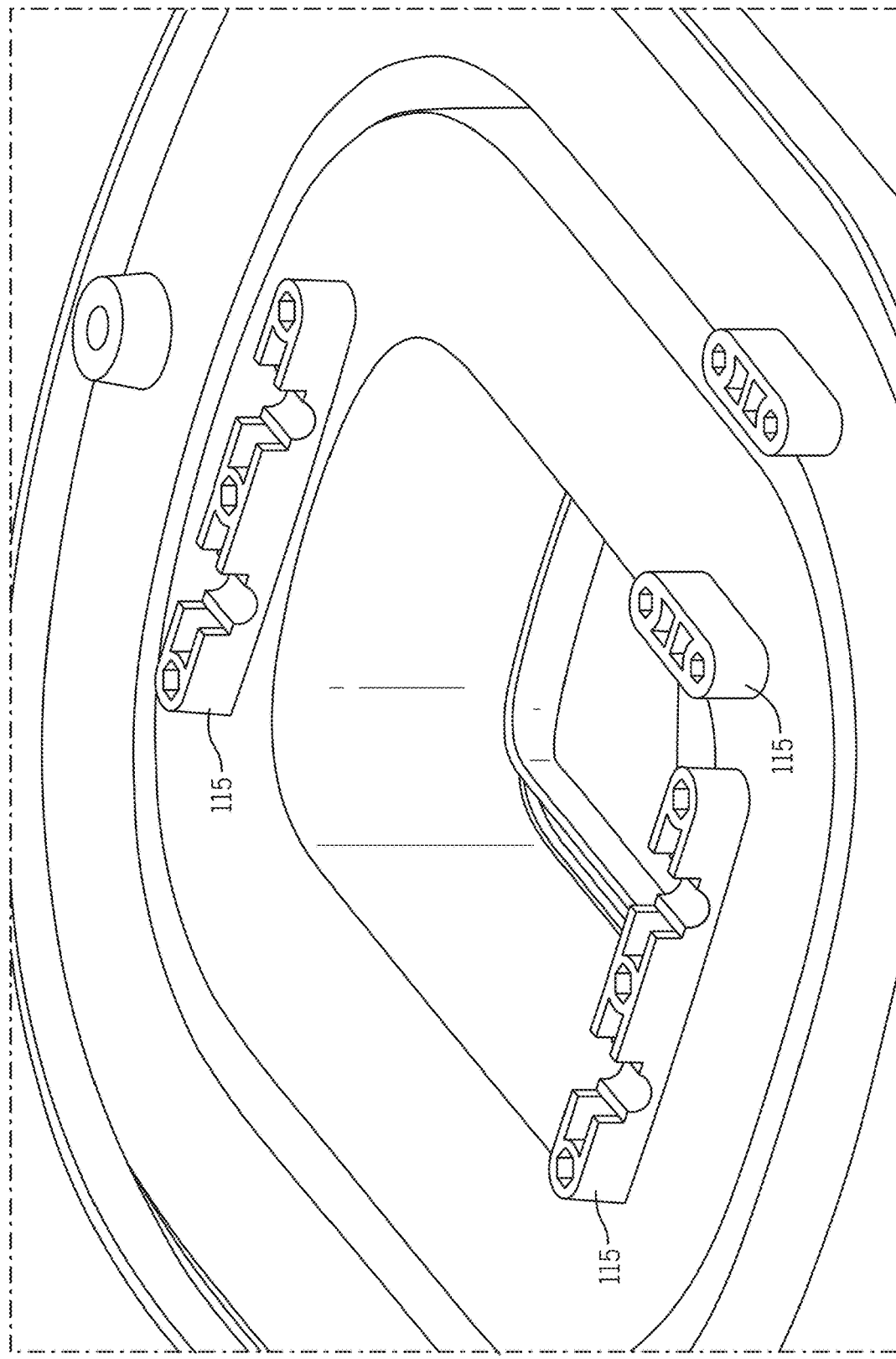
FIG. 5 illustrates mounting hardware for the drive mechanism.
Figure 6:
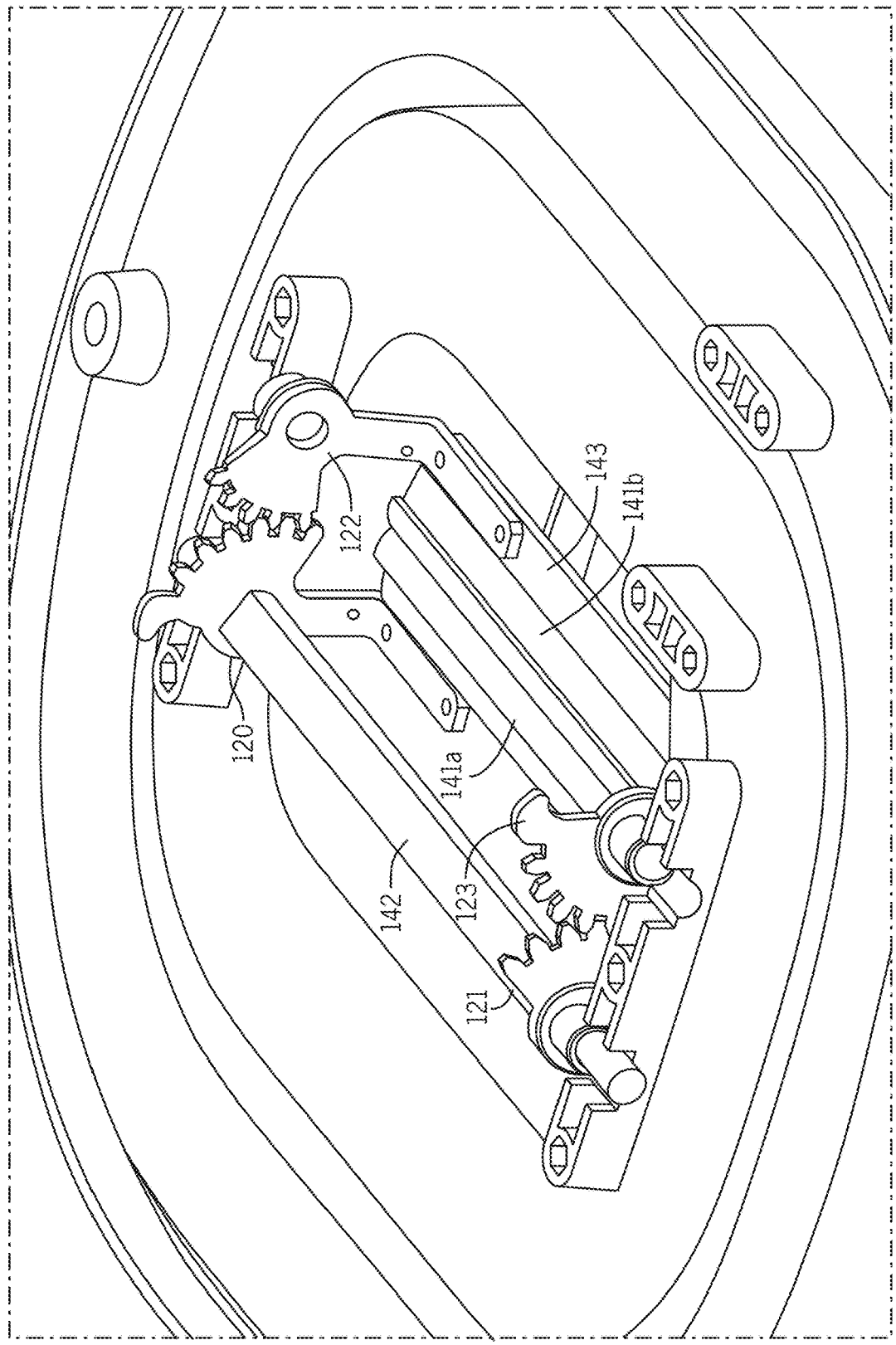
FIG. 6 illustrates the liner pinching system.
Figure 7:
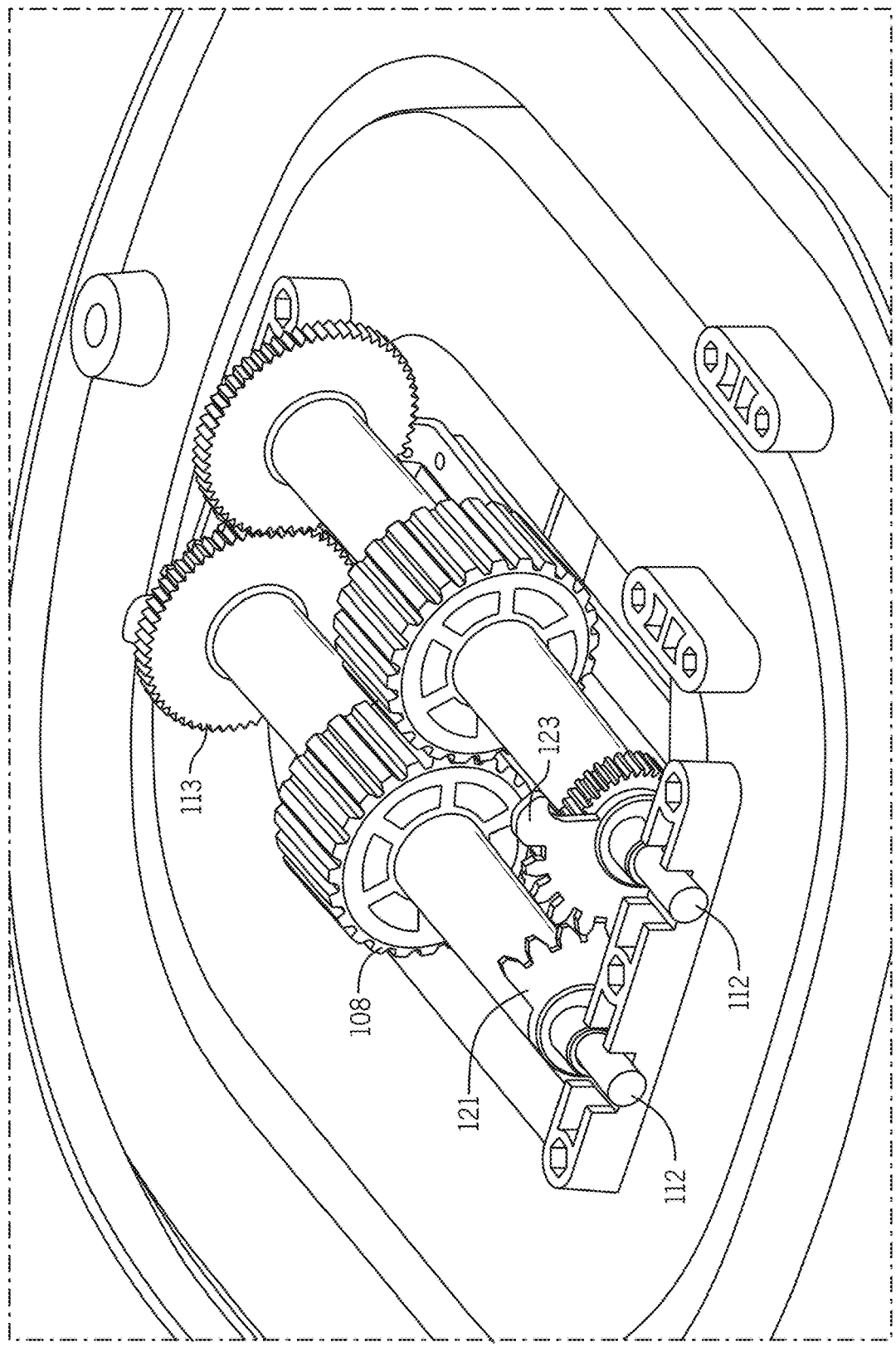
FIG. 7 illustrates the liner pinching system and the liner transport system.

FIGS. 5-7 illustrate a sequence for manufacturing the portable toilet 100. FIG. 5 illustrates mounting hardware for the drive mechanism. The portable toilet 100 may include one or more mounting brackets 115 for supporting the drive rack 110, the pinch arm system 107 and the drive shafts 112.

FIG. 6 illustrates the pinch arm system 107 mounted to the mounting brackets 115. The shaft 112 (e.g., FIG. 4) may be covered by a sleeve 142. In additional spacers may maintain a predetermined distance between the transport wheels 108 and gears 113 and 132. The gears 113 and 132 may be mounted directly to the sleeve 142. The assembly including gears 113 and 132 and sleeve 142 are able to rotate freely on the inner shaft. The pinch arms are mounted on the inner shaft are free to rotate on the inner shaft. Each of the pinch arms is supported by a pinch arm bracket 143 that is coupled with one or more gears. For example, a pinch arm 141a is connected to the pinch arm bracket 143 (not visible in FIG. 6) that is coupled to gear 120 and gear 121. Gear 120 and gear 121 may be partial gears (partially toothed gears) that do not have teeth along the entire circumference. A pinch arm 141b is connected to the pinch arm bracket 143 that is coupled to gear 122 and gear 123, which also may be partially toothed gears.

FIG. 7 illustrates the liner transport system 108 mounted after the pinch arm system 107. Odor from the waste held inside the plastic film liner is controlled by pinching the open end of the plastic film liner between the pair of pinching arms 141a and 141b (e.g., FIG. 6) that provide compliant surfaces to be in continuous and generally horizontal contact with the plastic film liner to seal it and the waste odor inside from escaping. These arms act as part of the transport mechanism and are timed to open (releasing the plastic film) before the transport wheels start to turn and move the plastic film, and then close after the transport wheels have stopped turning and the plastic film has also stopped moving. While these pinching arms are part of the transport mechanism, they operate independently from the transport wheels but are timed to the motion of the transport wheels through the drive rack 110.

Figure 8:
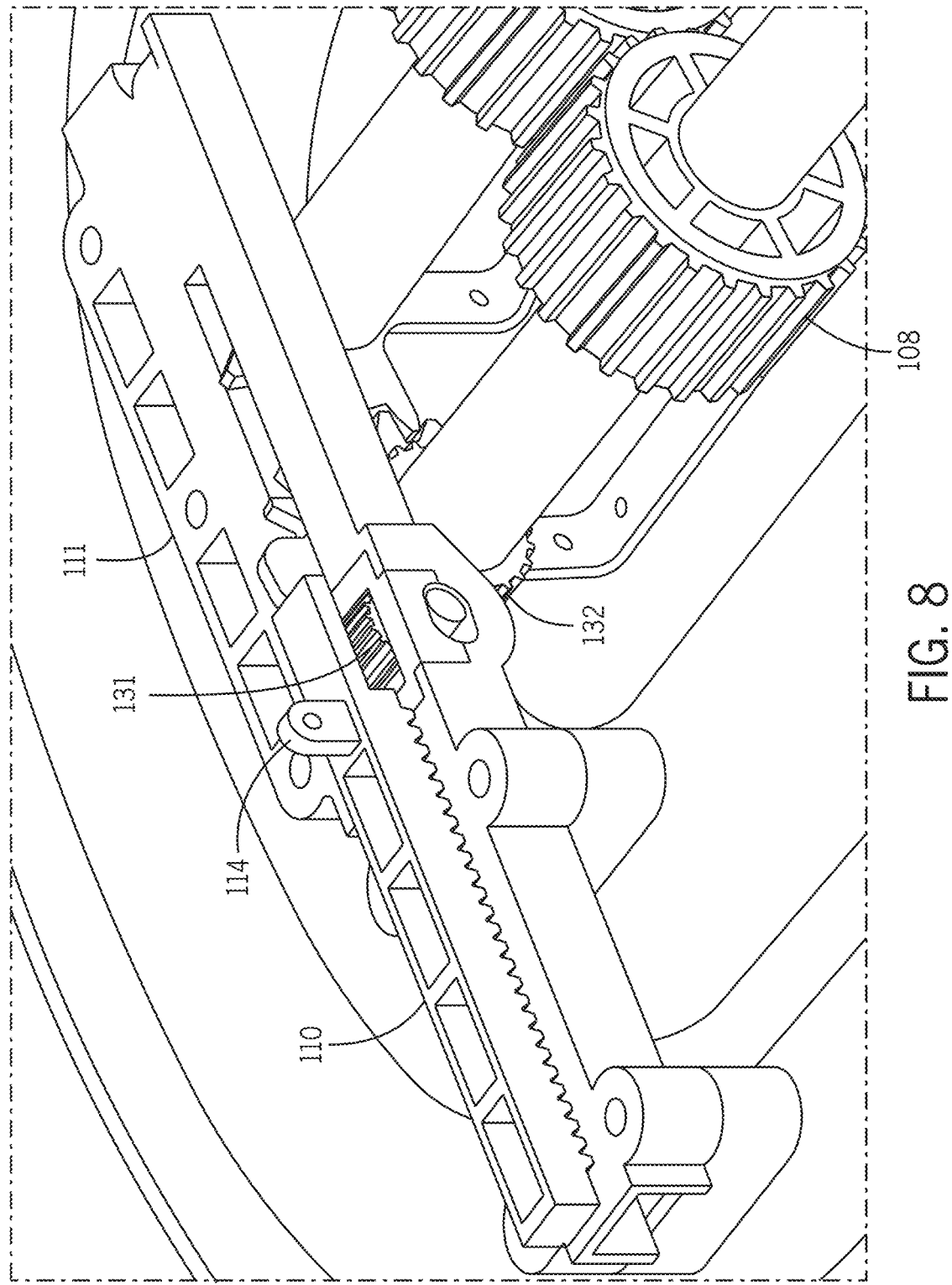
FIG. 8 illustrates a drive mechanism in a first position.

FIG. 8 illustrates a support bracket 111. The drive rack 110 is mounted on the support bracket 111. One or more guide rails facilitate movement of the drive rack 110 along the support bracket 111. The underside of the drive rack 110 includes a gear, which combined with the pinion gear 132. Together the drive rack 110 and the pinion gear 132 form a rack and pinion system. The pinion gear 132 may be a ratchet gear that is configured to engage with the pinch arm system 107 and/or the transport wheel system 108 a first direction and disengage the pinch arm system 107 and/or the transport wheel system 108 in a second direction. In this way, the drive shafts 112 are only allows to rotate in one rotational direction (e.g., clockwise) and the plastic film is only allowed to move in one transport direction (e.g., downward or in the direction of gravity).

The drive rack 110 has gear teeth to apply a force to the transport system, is flat in geometry, and moves in a horizontal direction. The flat shape of the drive rack 110 horizontal movement keeps the overall height of this transport system (and portable toilet 100) short. In one example, the entire height of the transport system (from the bottom of bowl 102 to the top of the waste cavity 104) may be 10-20 centimeters. In one example, the entire height of the transport system is set to be no more than the diameter of the transport and the swing of the pinch arms. The swing of the pitch arms may be measured by a projection in a direction parallel to the vertical plane.

The length of the drive rack 110 can be divided into sections with each section actuating the proper movement of the transport mechanism in the proper sequence. The gear of the drive rack 110 includes multiple sections including a first drive rack section configured to drive the pinch arms 141*a* and 141*b* and a second drive rack section configured to drive the drive shafts 112 for the transport wheels.

Figure 9:
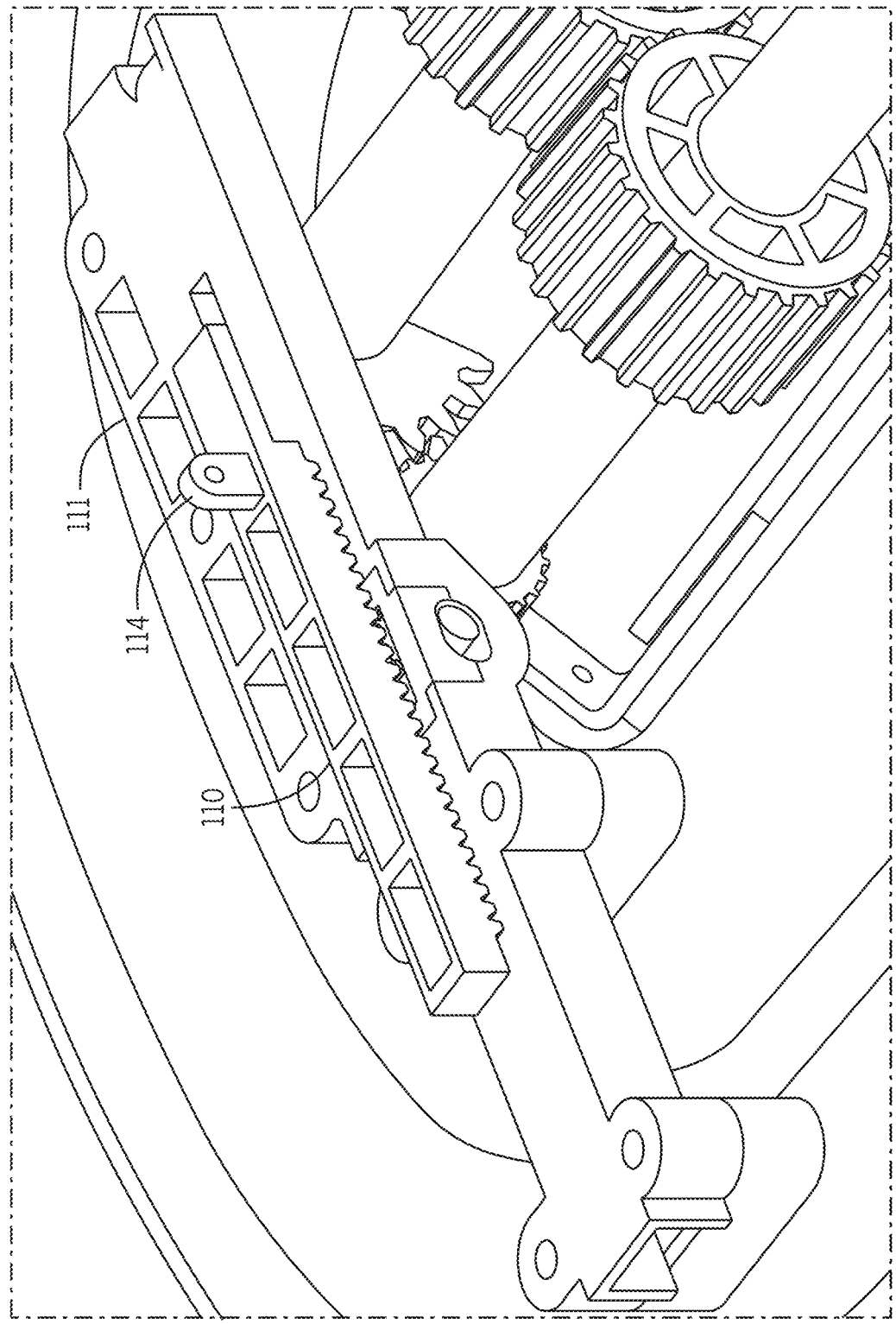
FIG. 9 illustrates a drive mechanism in a second position.
Figure 10:
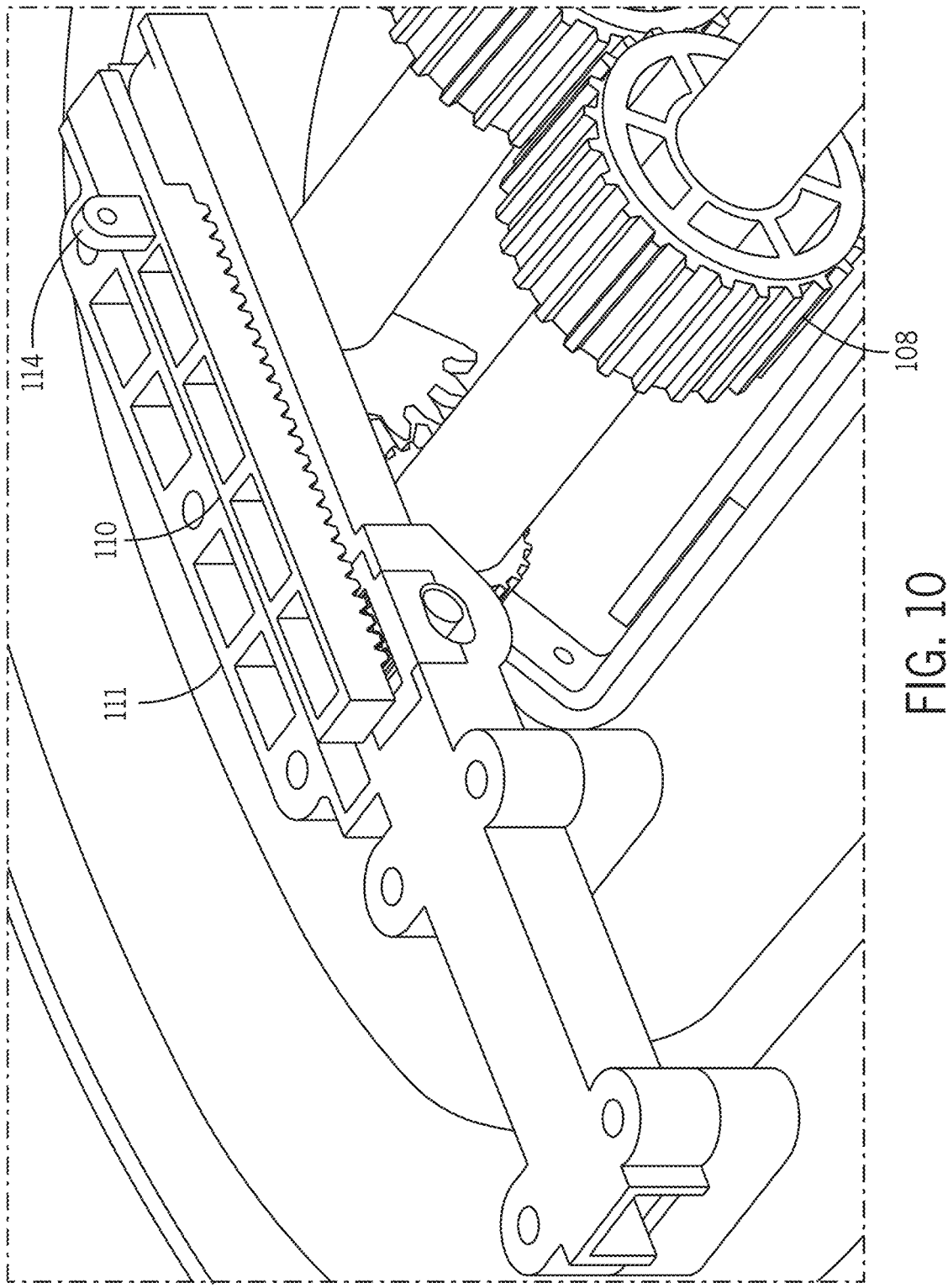
FIG. 10 illustrates a drive mechanism in a third position.

FIGS. 8-10 illustrate a sequence for the operation of the drive rack 110. The drive rack when traveling in its actuation direction will first interact with the pinch arm actuation lever, opening them and releasing the plastic film liner to be pulled into the storage container. Then the rack will next interact with the sliding pinion gear engaging it with the drive gears and drive shaft thus turning the wheels and moving the plastic film liner a predetermined amount into the storage contained. When the drive rack reaches the end of its travel, it is released and travels back to its starting position by spring force, first disengaging the drive pinion such that no addition motion of the drive shafts and transport wheels occurs, and then closing the pinch arms to reseal the plastic film liner.

FIG. 8 illustrates the drive rack 110 (drive mechanism) in a first position (home position). In the home position, the drive rack 110 is not engaged with the pinch arms system 107 or the transport wheels. FIG. 9 illustrates a drive mechanism in a second position (transport wheel position) as the drive rack is moved with respect to the support bracket 111. FIG. 10 illustrates a drive mechanism in a third position (pinch arm position) as the drive rack is further moved with respect to the support bracket 111.

Figure 11:
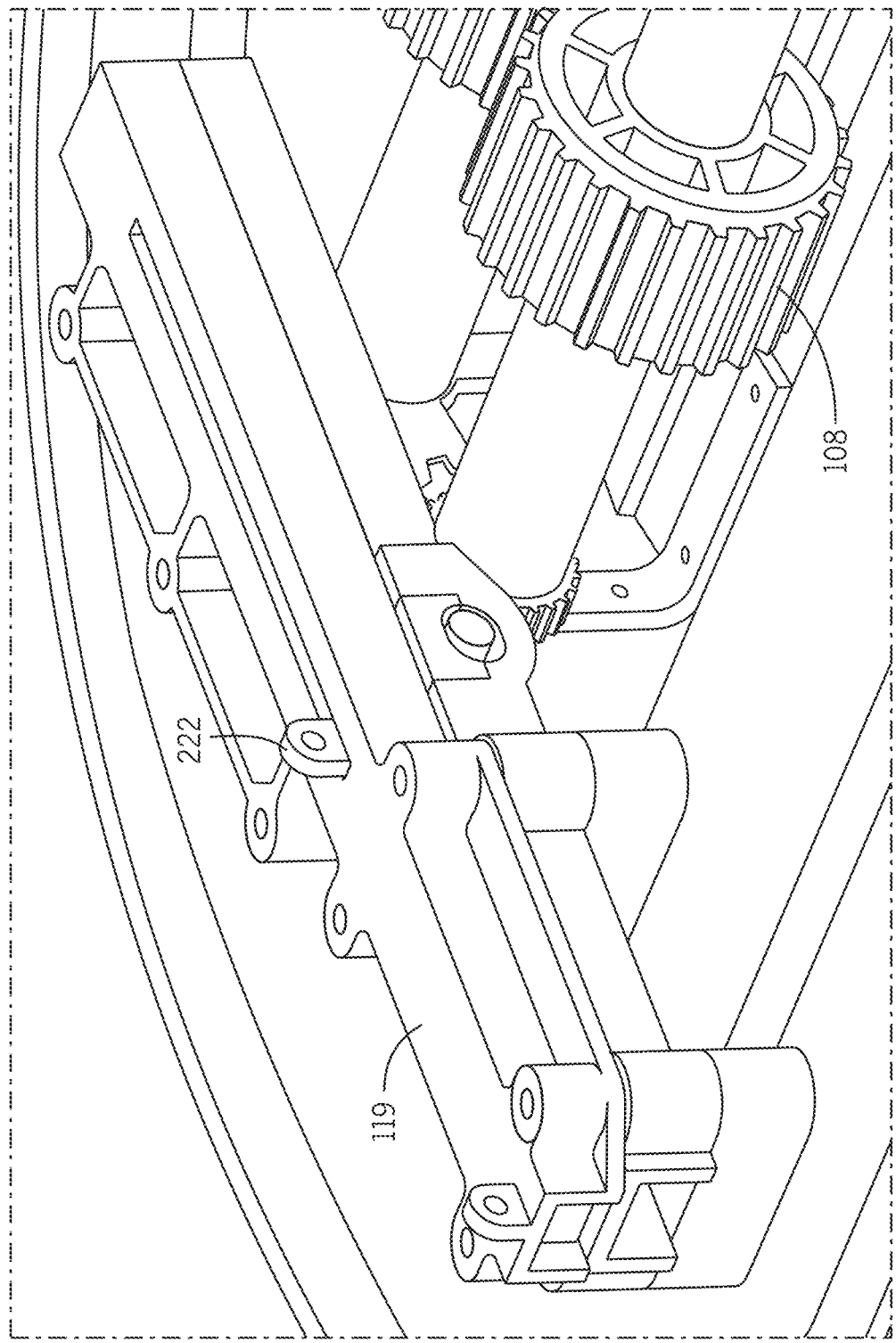
FIG. 11 illustrates a housing for the drive mechanism.
Figure 12:
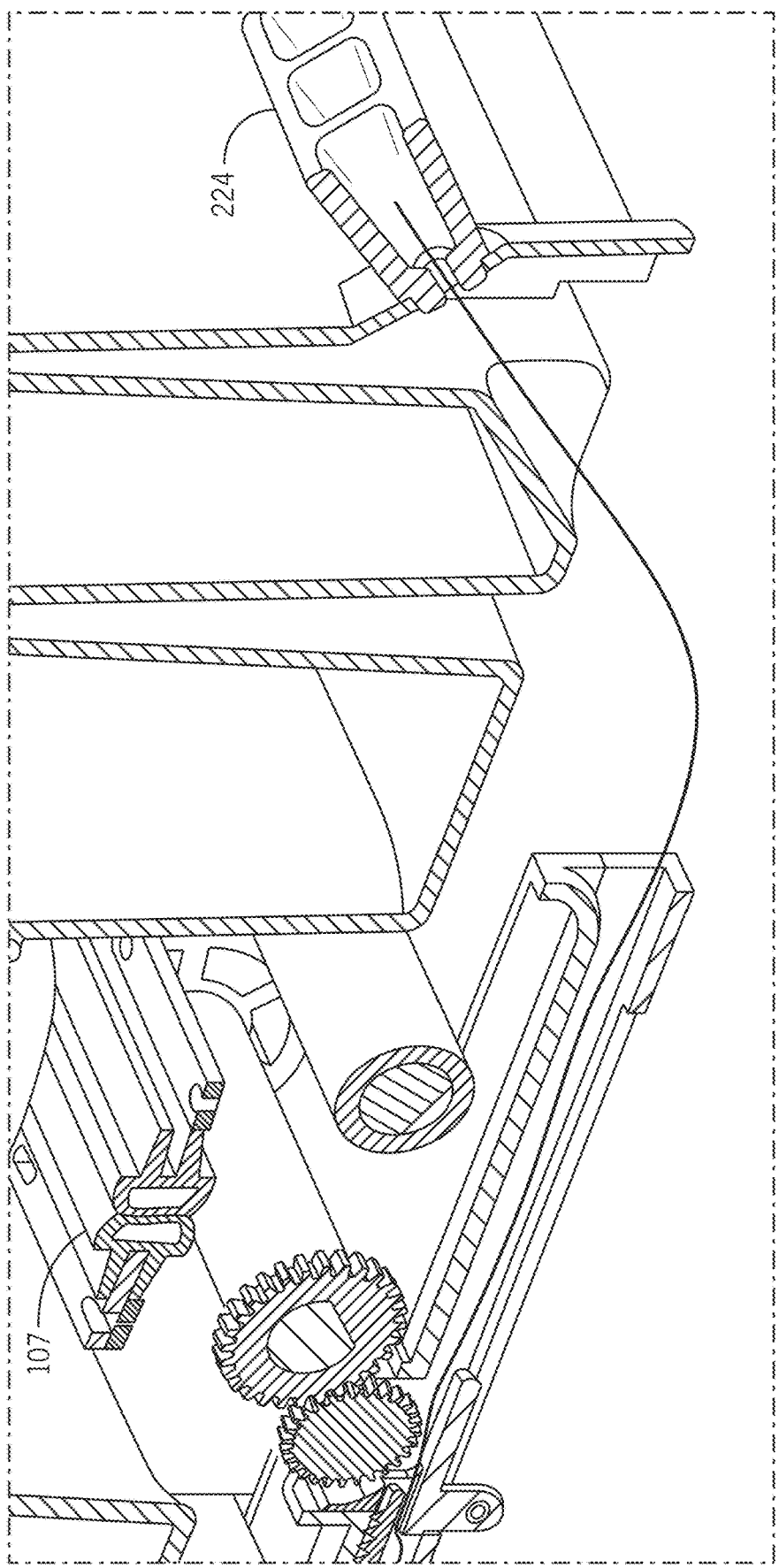
FIG. 12 illustrates a manual pull for the drive mechanism.

FIG. 11 illustrates a housing 119 for enclosing the drive mechanism. FIG. 11 illustrates a pull connector 222 and FIG. 12 illustrates a manual pull 224 for the drive mechanism. The manual pull 224 may be handle shaped for a human's hand to grip. To actuate the drive rack 110 for transport of the plastic film liner and the waste, the user pulls on the manual pull 224, which may be connected to a cord to the pull connector 222. When this pull cord is pulled, it motivates the drive rack 110 in the actuation direction, and when released, the drive rack returns to its resting position due to a spring force from a spring coupled to the drive rack 110. FIG. 11 also illustrates the liner pinching system 107.

Figure 13:
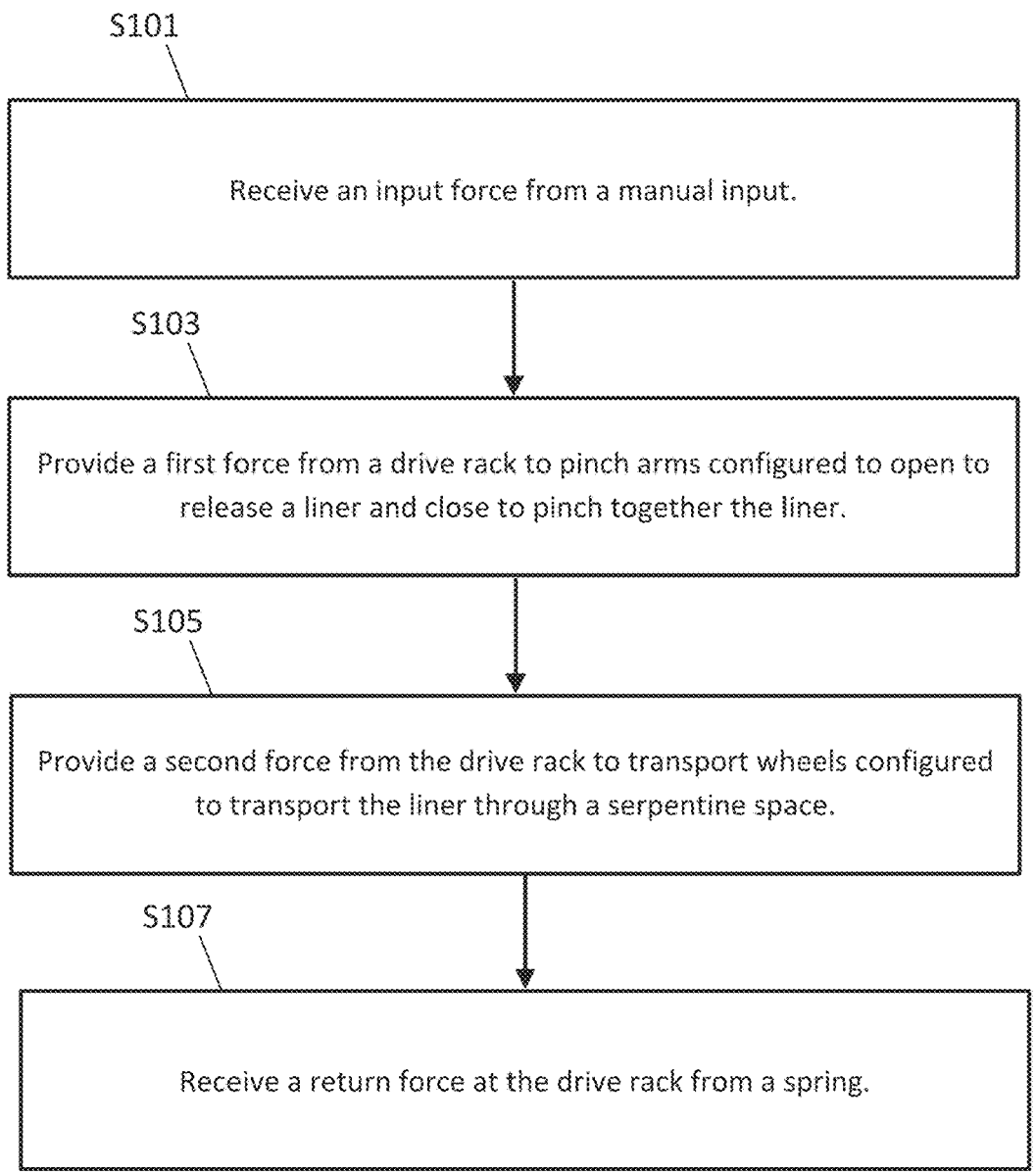
FIG. 13 illustrates an example flow chart for the operation of the portable toilet.

FIG. 13 illustrates an example flow chart for the operation of the portable toilet. Additional different or fewer acts may be used.

At act S101, the portable toilet 100 receives an input force from a manual input or handle. The input may be a rotational force received at a crank. The rotational force is translated to a linear force for the drive rack. However, other input mechanisms could be used such as a lever that directly applies a linear force to the rack. In other examples, a motor or solenoid powered by a batter may replace or supplement the manual input.

In some examples, the crank may be labeled at different rotational positions to reflect the operation of the coupled drive rack. For example, a first position may indicate the pinching operation. At act S103, the portable toilet 100 provides a first force from a drive rack to a plurality of pinch arms configured to open to release the liner and close to pinch together the liner as the pinching operation.

The crank may also be labeled for a drive position. At act S105, the portable toilet 100 provides a second force from the drive rack to a plurality of transport wheels configured to transport the liner through a serpentine space according to moving the crank from the pinging operation to the drive position.

The crank may also be labeled for a return position or a return direction. At act S107, the portable toilet 100 receives a return force at the drive rack from a spring. The return force resets the drive rack to receive a subsequent input form from the crank.

FIGS. 14-20 illustrate a second embodiment of a portable toilet using a plastic film liner in a tube configuration. This embodiment also solves the problems of toilet height and continuous odor. To solve the problem of system height, the transport mechanism creates a low-profile system of significantly shorter vertical height. The plastic film liner is moved by opposed interlocking transport drums with intermittent compliant high friction surfaces. Some components described with respect to the first embodiment are applicable to the second embodiment.

Figure 14A:
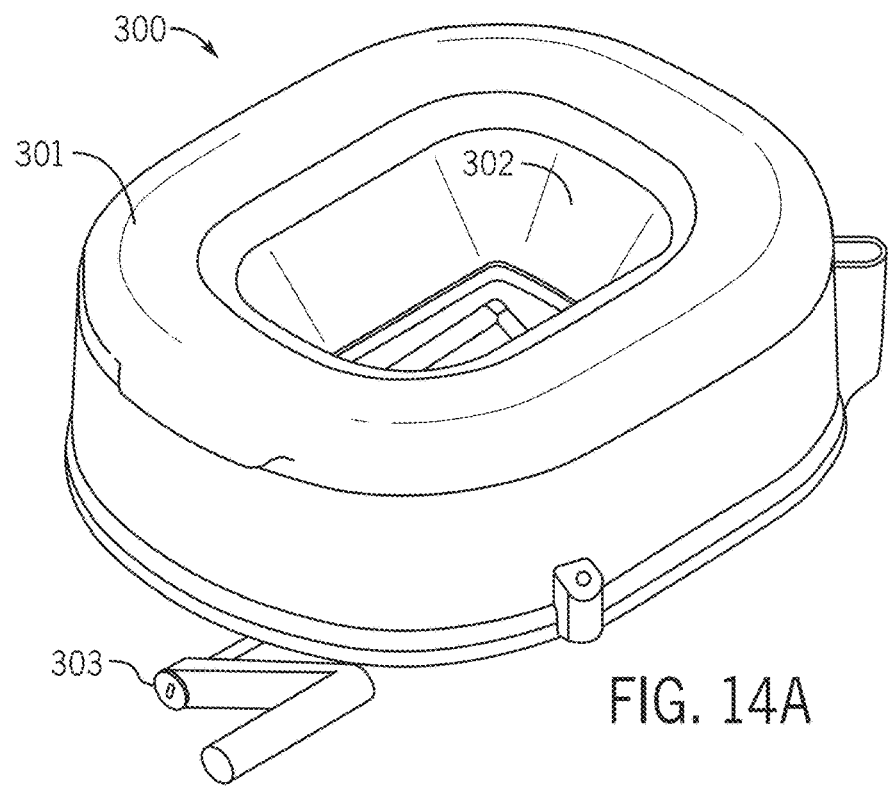
FIGS. 14A and 14B illustrate a second embodiment of a portable toilet.
Figure 14B:
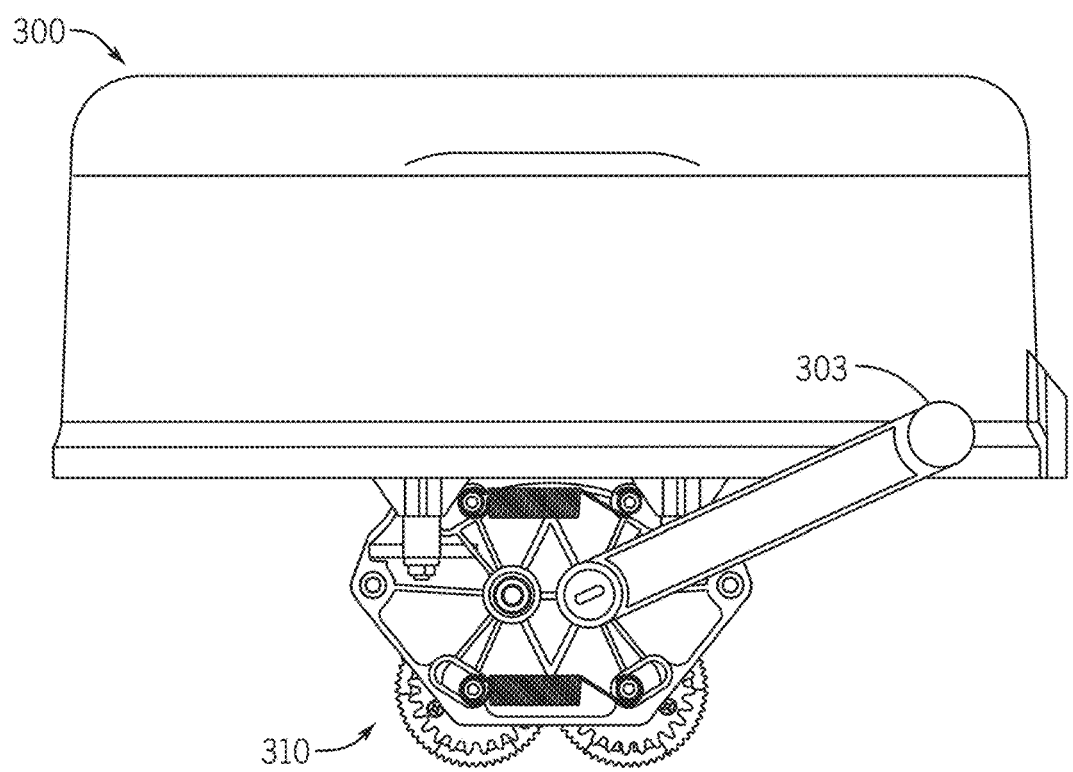

FIG. 14A illustrates a top view of the portable toilet, and FIG. 14B illustrates a side view of the portable toilet. The exterior of the portable toilet includes a seat 301, a bowl 302, and a crank or handle 303 for actuating the transport mechanism 310. The portable toilet may include a film storage compartment, as described in the first embodiment, configured to store a liner. Additional, different, or fewer components may be included.

The transport mechanism 310 is fastened to the underside of the toilet bowl. The transport mechanism 310 includes one or more transport wheels, and the handle 303 is connected to the one or more drums, which may be referred to as transport wheels, and the handle 303 is configured to drive the drums of the transport mechanism 310 under rotational force provided by a user (e.g., manually).

Figure 15A:
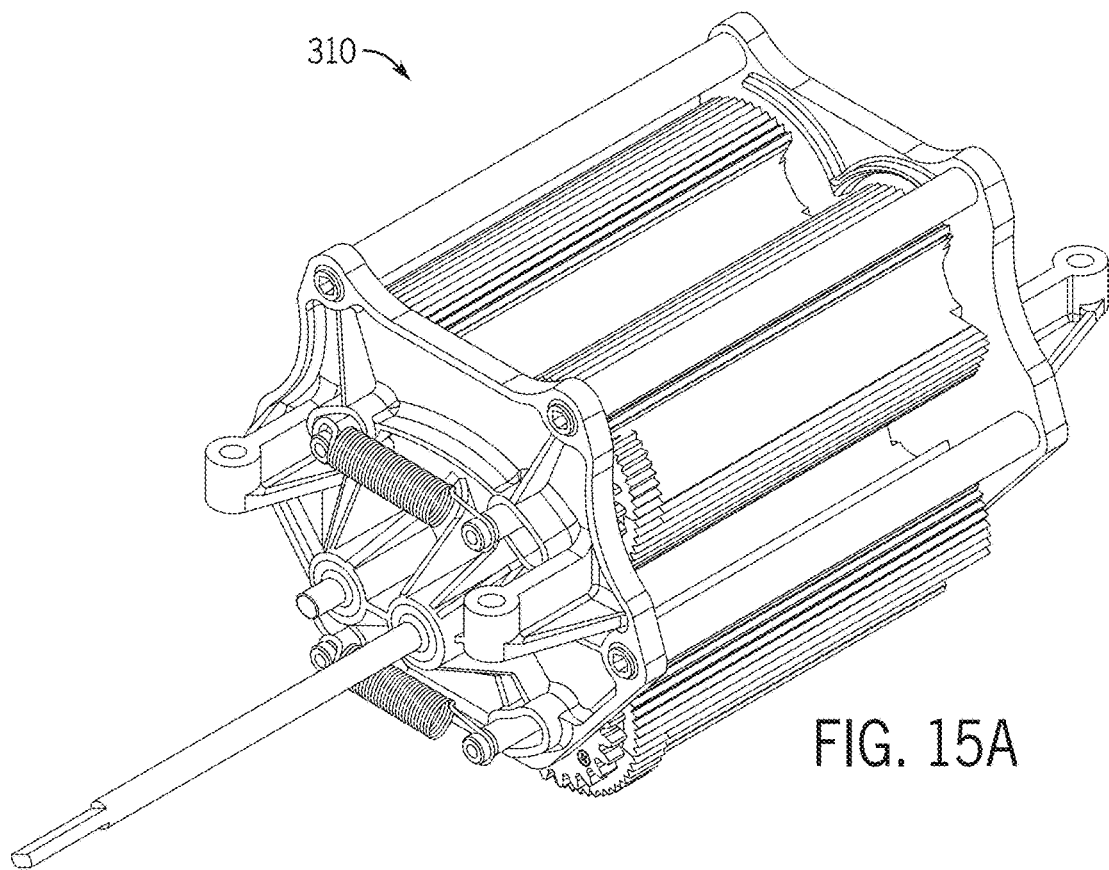
FIGS. 15A and 15B illustrate a second embodiment of the liner transport system.
Figure 15B:
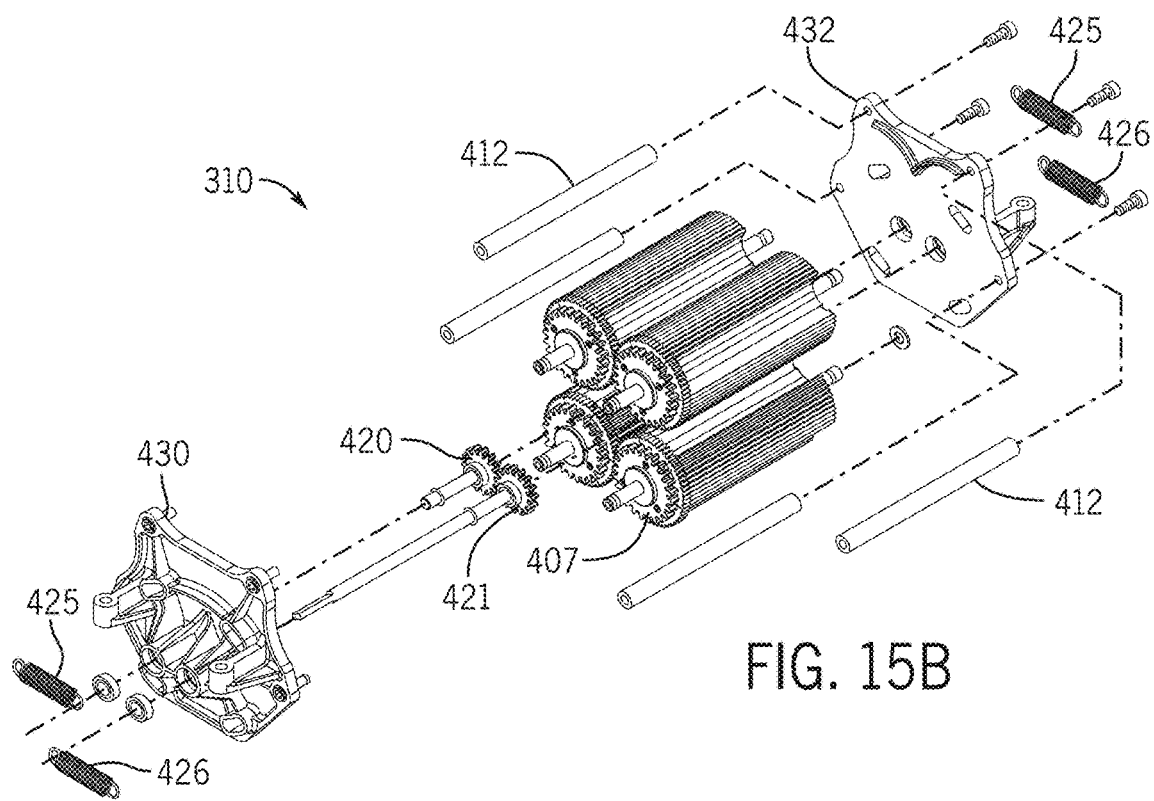

FIGS. 15A and 15B further illustrate the second embodiment of the liner transport system. FIG. 15A provides a detailed view of the assembled transport system 310. FIG. 15B provides an exploded view of the transport system 310. Individual components of the transport mechanism are described below.

Figure 16:
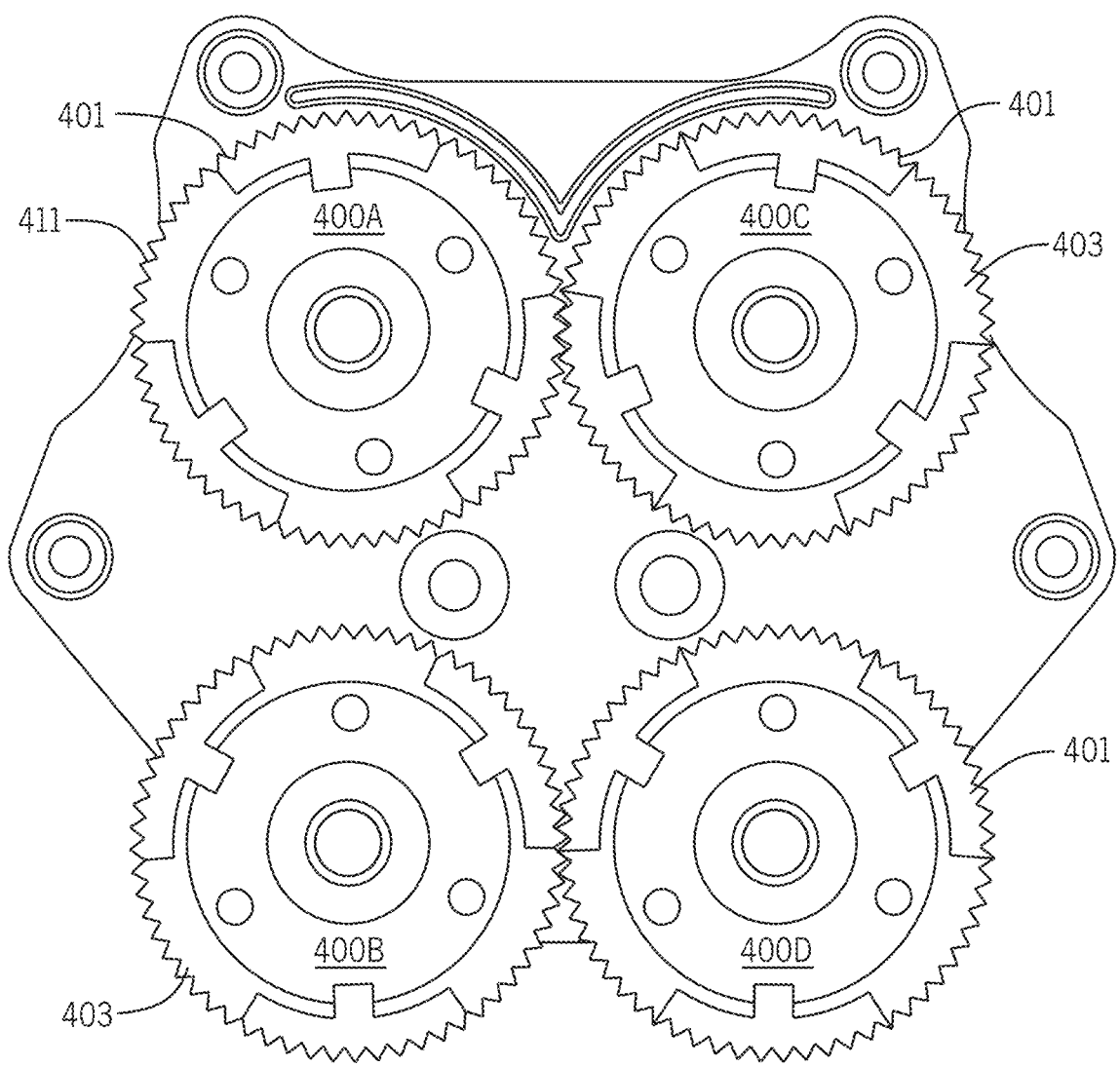
FIG. 16 illustrates the liner transport system on the second embodiment.

FIG. 16 illustrates the liner transport system 310 including multiple sets of drums or transport wheels 400 including a left upper transport wheel 400A, a left lower transport wheel 400B, a right upper transport wheel 400C, and a right lower transport wheel 400D. The drums or transport wheels 400 may arranged in pairs. For the direction of travel of the liner, an upper pair of drums (e.g., left upper transport wheel 400A and left lower transport wheel 400B) is upstream of a lower pair of drums (e.g., right upper transport wheel 400C and right lower transport wheel 400D). The lower pair of drums is downstream of the upper pair of drums, with respect to the direction of travel of the liner.

The upper pair of drums may be in compressive contact. The term compressive contact may mean that one of the pair of drums provides a force against the opposing one of the pair of drums, however, they do not actually contact because the liner is between them. Thus, compressive contact may mean not in direct contact but still moving in cooperation. The plastic film liner is threaded between these two pairs of drums during operation such that the coordinated rotation of these drums pulls the plastic film liner and the waste that it contains, downward in a continuous manner while the drums are rotating. Likewise, the upper pair of drums may be in compressive contact.

FIG. 16 further illustrates that the drums or transport wheels 400A-D includes alternating longitudinal sections around the drum. A first section 401 alternates with a second section 403. The first section 401 may be a high contact friction surface that is configured to grip and advance the liner. The high contact friction surface may include a rubber-like elastomer of a predetermined hardness. The predetermined hardness may be of the scale for shore-A durometer in the range of approximately 70. For example, the predetermined hardness may be in the range of 50 to 90 for the shore-A durometer scale. The high contact surface is in intimate and forceful contact with the opposing contact surface. The space between the high friction area of opposing sections 401 advances the liner may be referred to as a serpentine space.

The second section 403 may be a hollowed, recessed, or concave section of the drum configured to relieve tension in the liner as well as allow waste to pass. FIG. 16 illustrates three first sections 401 (high friction) and three second sections 403 (hollowed areas). However, any number of first sections 401 and second sections 403 may be used. In one example, two first sections 401 and two section sections 403 are used. In another example, only one first section 401 is used with one second section 401.

As shown in FIG. 16, each of the transport wheels 400A-D includes two of the first section 401 and two of the second section 403. Each of the sections may span a predetermined amount of the transport wheel. For example, each of the sections may span approximately 90 degrees of the transport wheel. Different ratios are possible. In some examples, the first section 401 is longer (spans a wider angle) than the second section 403. This example may provide move force to advance the liner. In some examples, the second section 403 is longer (spans a wider angle) than the first section 401. This example may provide large spaces for advance waste through the transport system 310.

The first section 401 and the second section 403 are longitudinal sections that extend along the longitudinal axis of the drum. As each drum pair rotates, they do so in a coordinated manner, so the high friction surfaces align on each drum pair and the hollowed sections then also align as they rotate. The result is the plastic film liner is pulled down by the high friction surface, and then with continued rotation, the plastic film liner tension is relieved by the hollowed section in the surface of the drums.

Figure 17:
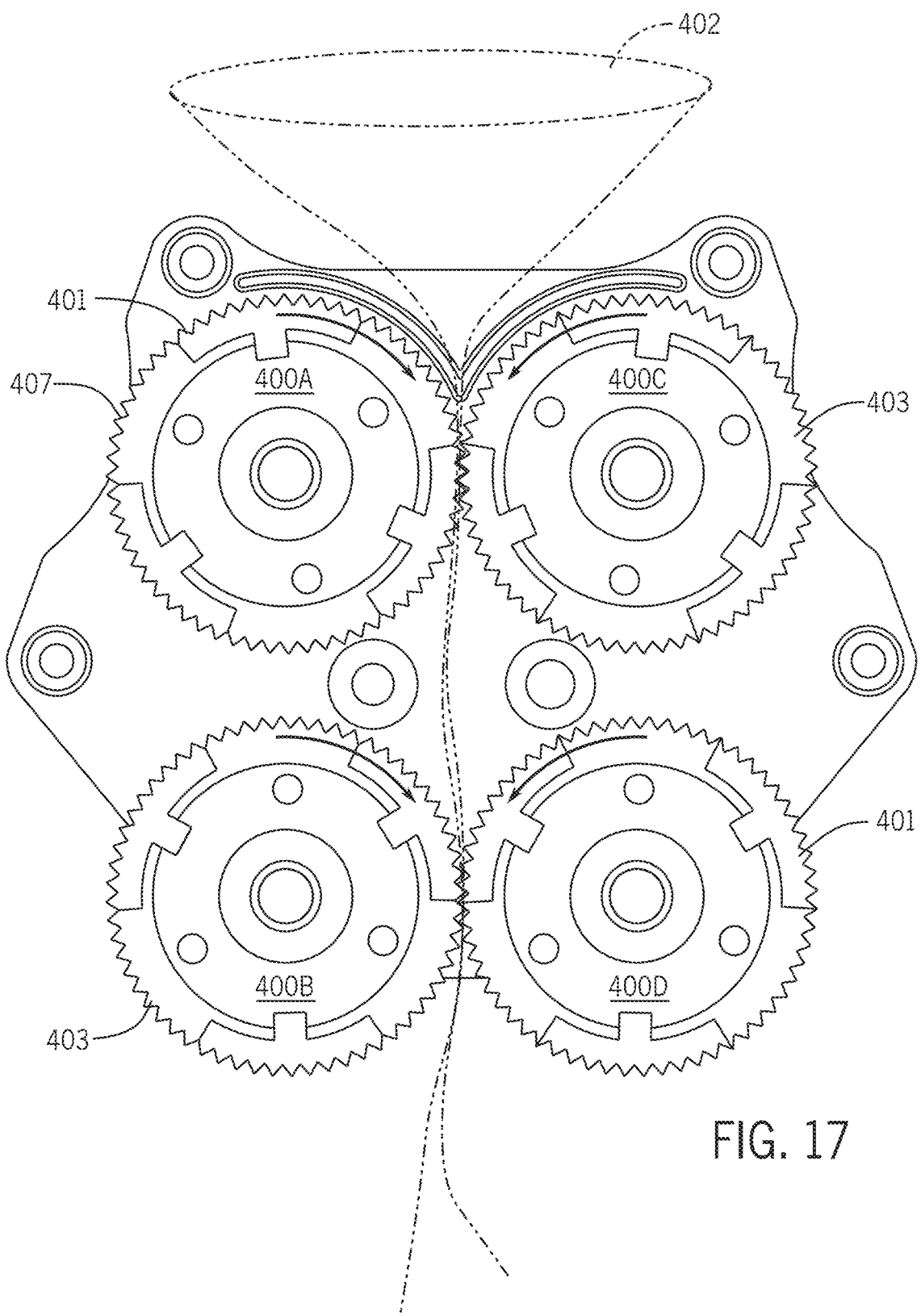
FIG. 17 illustrates the second embodiment of the liner transport system including a transported liner.

As illustrated in FIG. 17, the upper and lower pairs of drums coordinate motion. As the high friction surface areas of the first section 401 for the upper pair of drums starts to leave contact with the liner, the high friction surface areas of the first section 401 of the lower pair of drums starts to make contact with the liner. This means there is a continuous force applied to advance the liner (e.g., while the handle 303 is cranked) either by the upper pair of transport rollers or the lower pair of transport roller. In addition, there is always (substantially continuously) a break in the compression at the section sections 403, either by the upper pair of transport rollers or the lower pair of transport rollers, which are hollow and allow a volume within the liner to be advanced.

By eliminating the belts wrapping around the upper and lower drums, and replacing that function with high friction surfaces on the drums themselves, the space between the upper and lower drums can be reduced, saving that space as well as the space consumed by the belt itself to achieve a reduced height of the line transport system 310. FIG. 17 illustrates the reduced height of the liner transport system 310 for advancing a liner 402. The height of the liner transport system 310 may be a predetermined height based on the diameter of the transport drums. For example, the height (H) of the liner transport system 310 may be less than a predetermined multiplier (k) times the diameter ($D_{drum}$) of the transport drums–H<k*($D_{drum}$). Examples for k may be 2.5, 3, or another value. In one example, the entire height of the transport system (from the bottom of bowl 102 to the top of the waste cavity 104) may only be 10-20 centimeters.

Figure 18:
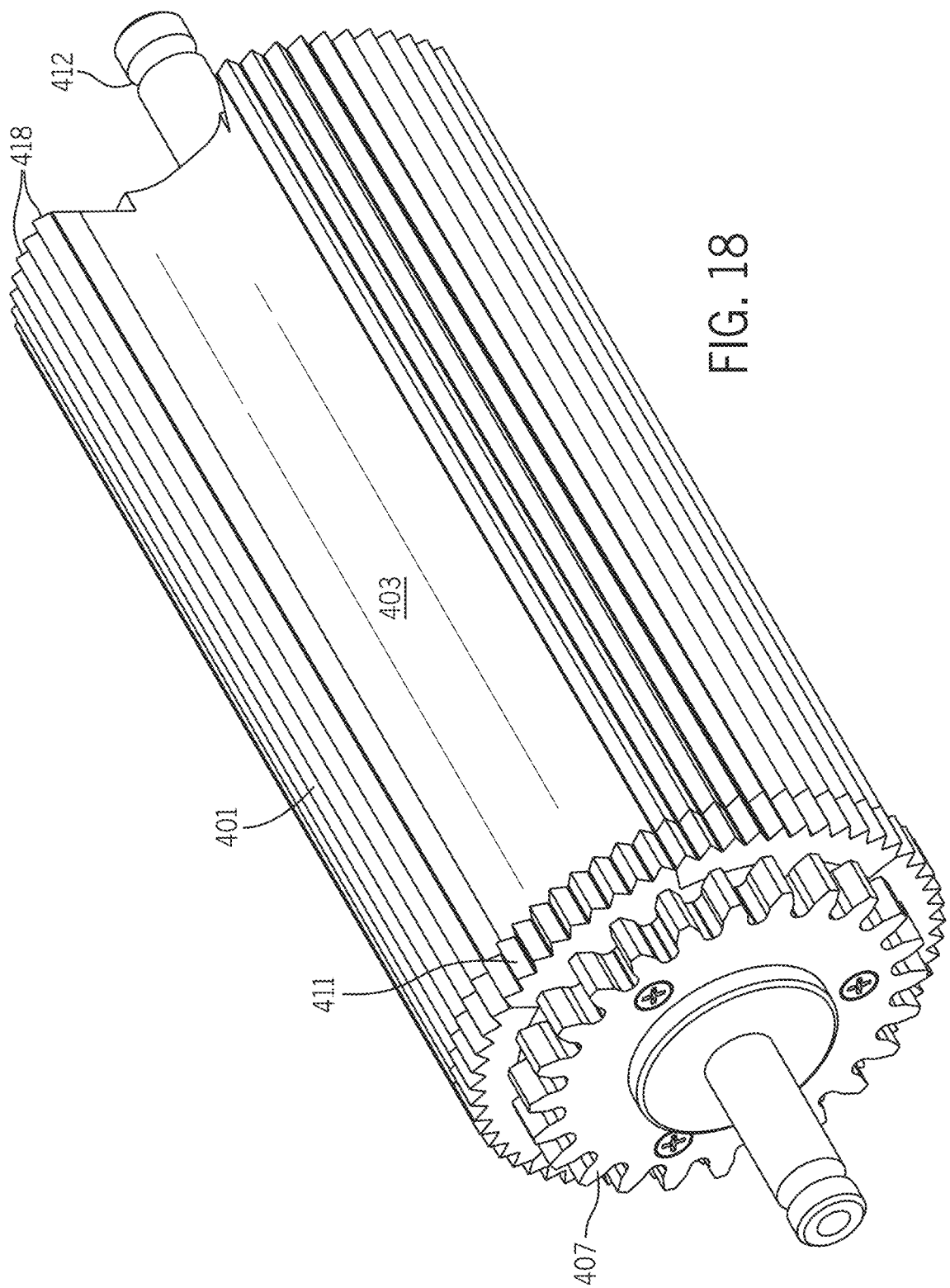
FIG. 18 illustrates an example roller from the second embodiment of the liner transport system.

FIG. 18 illustrates an example drum or transport roller 400A-D from the liner transport system 310. Each drum or transport roller 400A-D includes one or more first sections 401 for contacting and advancing the liner and one or more second section 403 for allowing objects to pass through the transport system 410. Additional, different, or fewer components may be included.

The first section 401 (contacting section) may extend the full length of the roller. The first section 401 may extend a substantial portion of the length of the roller (e.g., 90%). Adjacent to the first section 401 may be a drive gear 407 for receiving a force to drive the roller.

Optionally, either integral with the first section 401 or adjacent to the first section is an interlocking gear 411. The interlocking gear 411 may assist in maintaining the drums locked together in cooperative motion. That is, the interlocking gear 411 of the left upper transport wheel 400A is interlocked with the interlocking gear 411 of the right upper transport wheel 400C. Similarly, the interlocking gear 411 of the left lower transport wheel 400B is interlocked with the interlocking gear 411 of the right lower transport wheel 400D. The interlocking gear 411 may be omitted. In this embodiment, the task of timing and driving the drums is performed by drive gears 407. In this regard, the driving gear 407 could be an integral part of the drum.

The first section 401 may be formed of a compliant material such as elastomer formed in the shape of malleable teeth 418 that apply an advancing force to the liner. The first section 401 may be formed of a rigid material. The teeth 418 may be formed from a different material that the rest of the first section. In another example, the teeth 418 and transport wheels are formed integrally. The two opposing first section 401 move together to form the serpentine space between the teeth 418.

The first section 403 (hollow section or cargo section) may extend the full length of the roller. The second section 403 may extend a substantial portion of the length of the roller (e.g., 80%). Adjacent to the second section 403 may be a drive gear 407.

In the radial direction, the second section may extend a predetermined distance into the drum. The predetermined distance may be a fraction of the radius (e.g., ⅓ of the radius, ½ of the radius) or a specific length (e.g., 2 centimeters, 4 centimeters) into the drum.

The upper and lower drum roller pairs also rotate in a coordinated fashion. When the plastic film liner is being pulled down by the high friction surfaces of the upper pair of drums, the lower pair of drums has rotated to create a pocket between them formed by the hollowed sections allowing waste within the plastic film liner to pass without being squeezed back out. As the drums continue to rotate, the transport condition switches such that the lower pair of drums pulls the plastic film liner downward with its high friction surfaces while the upper pair of drums forms a pocket with its hollowed sections to engulf the waste above it within the plastic film liner. In this way, the plastic film liner is drawn downward by the alternating grip of the high friction surfaces of the upper and lower pair of drums. Conversely, the waste within the liner is transported through the drums by sequential formation of pockets by the hollowed sections of first the upper drum pair, and then the lower drum pair as the plastic film liner and the waste contained in it is pulled downward by the drums.

In other words, each of the transport wheels 400A-D includes the high friction area 401 and the hollow area 403 such that the left upper transport wheel 400A contacts the liner 402 at the same time the high friction area 401 of the right upper transport wheel 400C contacts the liner 402. Likewise, the high friction area 401 of the left lower transport wheel 400B contacts the liner 402 at the same time the high friction area 401 of the right lower transport wheel 400D contacts the liner 402. It is also true that the high friction area 401 of the left lower transport wheel 400B contacts the liner 402 at a different time that the high friction area 401 of the left upper transport wheel 400A contacts the liner 402. Other relationships are apparent from the figures.

The rotation of the upper and lower drum pairs is coordinated such that as the high friction surface on the upper pair is releasing the plastic film liner, the high friction surface on the lower pair is engaging with the plastic liner. This process of alternating the grip on plastic film liner between the upper and lower drum pairs keeps a constant grip on the plastic film liner. The rotational overlap of the high frictional surfaces between the upper and lower pairs is a few degrees of rotation and is enough such that the plastic film liner is always gripped and compressed by one of the drum pairs and in this way remains sealed so that odors do not escape.

Figure 19:
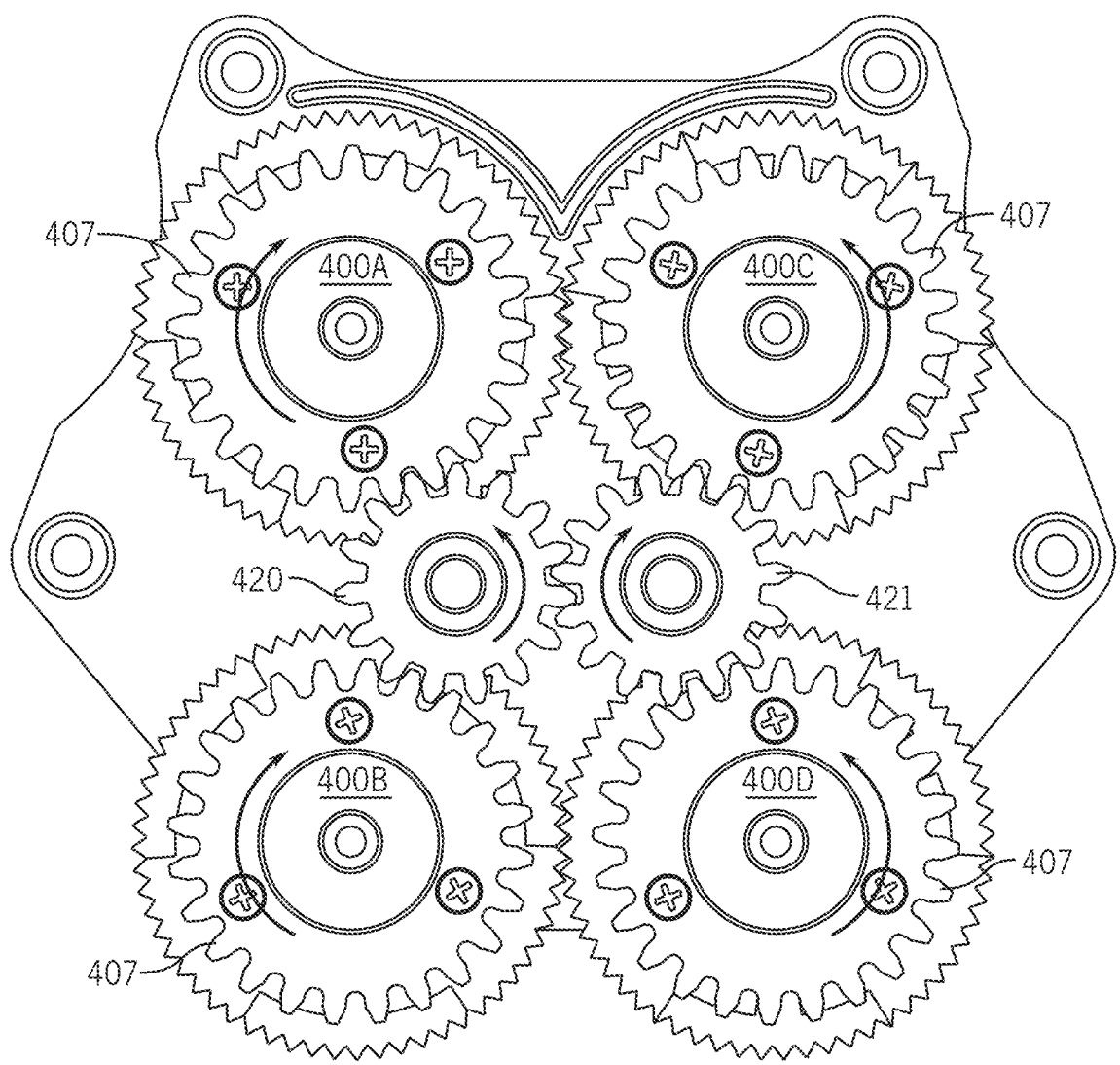
FIG. 19 illustrates a drive train for the second embodiment of the liner transport system.

FIG. 19 illustrates a drive train for the second embodiment of the liner transport system. As described above, each of the transport rollers 400A-D includes a drive gear 407 (affixed gear). The left upper transport wheel 400A and the left lower transport wheel 400B are meshed with a left pinion gear 420, and the right upper transport wheel 400C and the right lower transport wheel 400D are meshed with a right pinion wheel 421. The drive gear 407 for each drum is of equal size, or substantially equal size, so that the transport rollers 400A-D rotate at the same rate. The left pinion gear 420 and the right pinion gear drive each other. The handle 303 (crank) is connected to one of the pinion gears so when the crank is rotated, the second pinion also rotates, and all four drums rotate in a timed and coordinated manner. The ratio of rotation speed of the crank to the drums can be adjusted based on the ratio of gear sizes used. The same motion can be also accomplished with the use of belts and timing pulleys.

Figure 20:
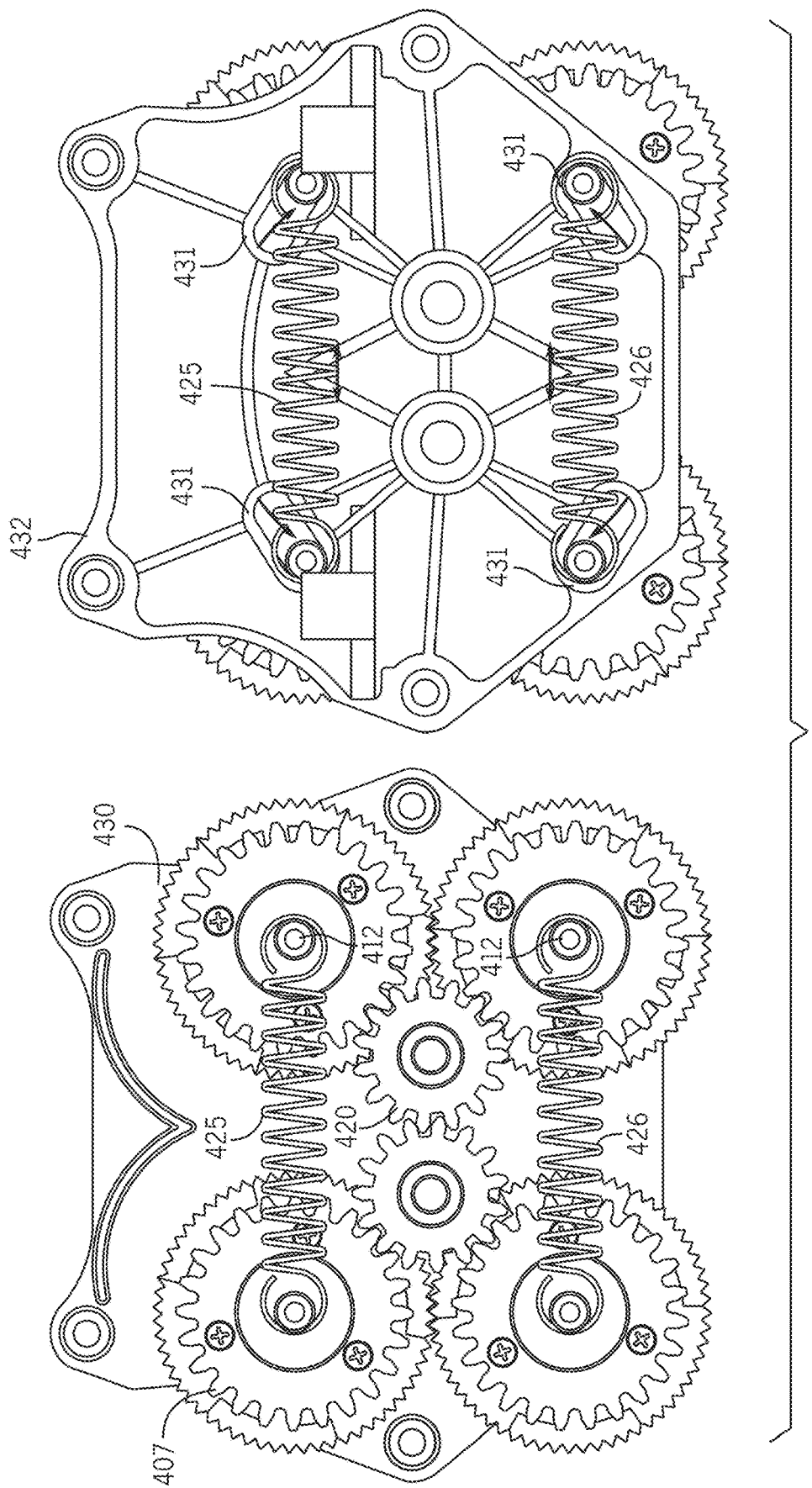
FIG. 20 illustrates a tensioning system for the second embodiment of the liner transport system.

FIG. 20 illustrates a tensioning system for the second embodiment of the liner transport system. The tensioning system includes a pair of springs. An upper spring 425 connects the left upper transport wheel 400A and the right upper transport wheel 400C by biasing them toward each other. The upper spring 425 may be connected to the shafts 412 (center shafts) of the left upper transport wheel 400A and the right upper transport wheel 400C. A lower spring 426 connects the left lower transport wheel 400G the right lower transport wheel 400D by biasing them toward each other. The lower spring 426 may be connected to the shafts 412 of the left lower transport wheel 400G the right lower transport wheel 400D. There may be two sets of springs—a first upper spring 425 and lower spring 426 at a first longitudinal end of the transport wheels 400A-D and a second an upper spring 425 and lower spring 426 at an opposite second longitudinal end of the transport wheels 400A-D.

In addition, the transport wheels may be configured to separate in certain scenarios (e.g., pivot away from one another about a pivot axis that is different than the rotation axis of the transport wheels 400A-D). The center shafts 412 that support the transport wheels are mounted to are attached to the portable toilet in an adjustable manner which allows the shafts 412 and transport wheels to be separated when required. Since the transport wheels are also compliant, when a ridged object is dropped into the toilet bowl 102, and this transport mechanism is operated, the ridged object will be allowed through the system by displacing the transport wheels and center shafts 412, without damage to the portable toilet 100.

To accommodate the transport of foreign objects that may not compress easily, the drum axle centers are able to dislocate from their natural positions and spread apart from each other allowing the drum pairs to pass solid objects between them while still transporting the plastic film liner. Since each end of each pair of drum centers (upper and lower) is held in compression with a tension spring (upper spring 425 or lower spring 426), the drums are able to immediately move back into their natural position in contact with each other as soon as the foreign object has passed by.

Front plate 430 and rear plate 432 support the center shafts 412 of the transport wheels 400A-D. Either of the front plate 430 or the rear plate 432 or both may include one or more slots 431 that allow the center shafts 412 to move or pivot with respect to the supporting plate.

The slots 431 may have a low friction perimeter to facilitate movement. The movement of the center shafts 412 allows at least one of the left upper transport wheel 400A and the right upper transport wheel 400C to be movable along the path of the slot 431 and/or at least one of the left lower transport wheel 400B and the right lower transport wheel 400B along the path of another slot 431. The slots 431 may be curved. The curvature may match the shape of the corresponding pinion gear. The first path is concentric with the first pinon gear or the second path is concentric with the second pinion gear.

During this process where the drums centers are in motion, the drums are still continuously driven by the pinion drive gears. This is possible because the drum centers are forced to move on a path that is concentric with the pinion drive gears. As the drums are dislocated by a foreign object passing by, the drum centers stay on the pinion drive gear concentric path and drum gear never separates from its pinion drive gear.

Figure 21:
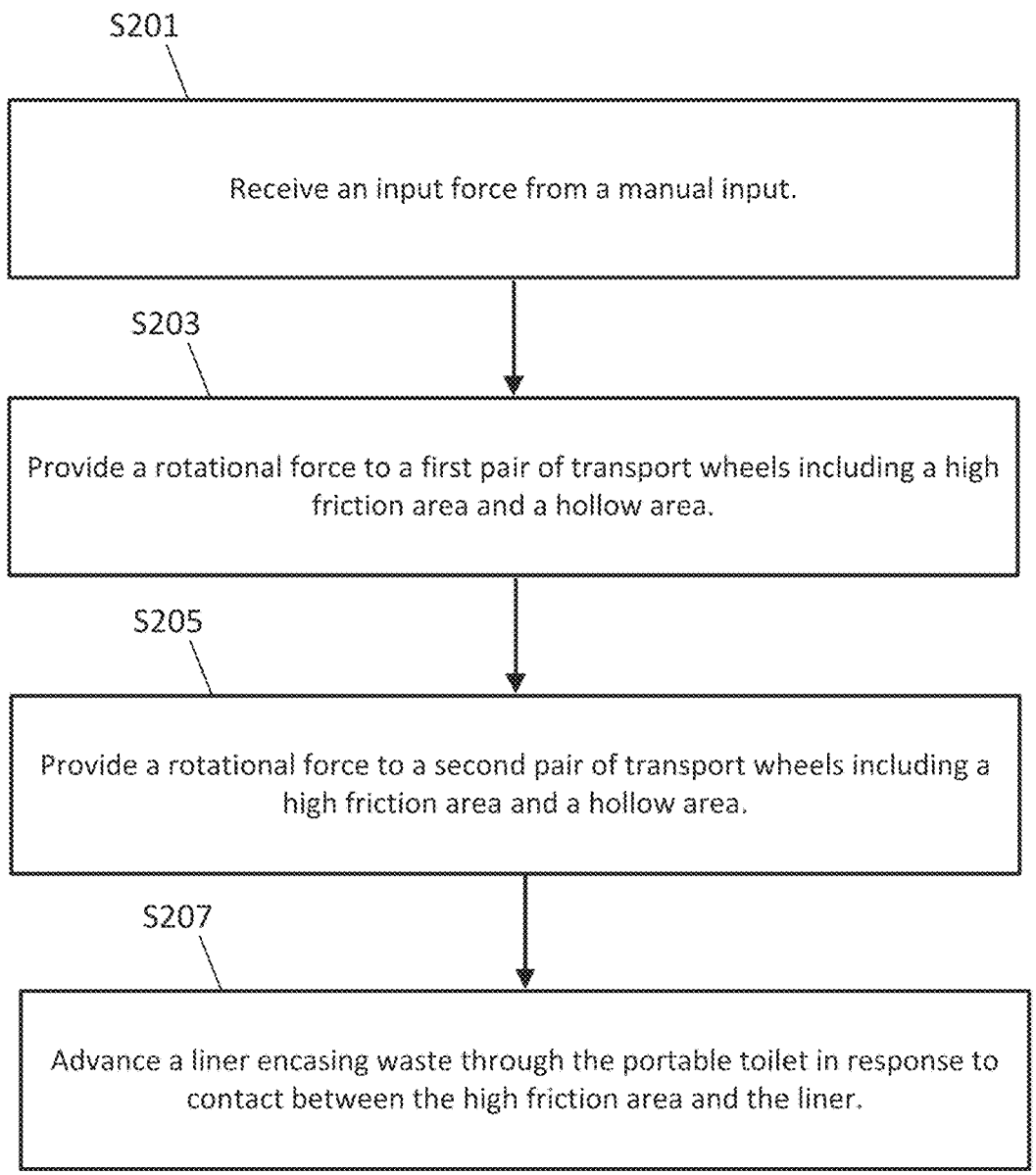
FIG. 21 illustrates an example flow chart for the operation of the second embodiment of the portable toilet.

FIG. 21 illustrates an example flow chart for the operation of the second embodiment of the portable toilet. At act S201, the handle or crank 303 receives an input force from a manual input. At act S203, the input force provides a rotational force to a first pair of transport wheels including at least one of the first pair of transport wheels includes a high friction area and a hollow area. At act S205, the input force directly or indirectly through one or more pinion gears provides a second rotational force to a second pair of transport wheels including at least one of the second pair of transport wheels includes a high friction area and a hollow area. At act S207, the first pair of transport wheels and/or the second pair of transport wheels advances a liner encasing waste through the portable toilet in response to contact between the high friction area and the liner.

FIGS. 22-27 illustrate a third embodiment of a portable toilet using a plastic film liner in a tube configuration. One approach to CBS is to first wrap the waste in an airtight plastic film prior to depositing that waste into a container suitable for waste accumulation. By first wrapping the waste in a film, odors are minimized and surfaces within the toilet system are kept clean. Some conventional configurations include a relatively tall toilet unit that requires a step be placed in front of the toilet for users to step up to and sit on the toilet seat. This can be an inconvenience for users but is also be an issue for households with limited space and low ceilings. An additional disadvantage is that ribs on the opposing conveyer belts of the transport mechanism are used to seal the plastic film liner. To seal the plastic film liner, the generally horizontal ribs on the conveyer belts must be synchronized to meet with each rotation of the transport mechanism and must be continuous to provide an airtight seal on the plastic film liner. As the transport mechanism rotates, and the waste is pulled down into the container, a volume of air is also ingested into the plastic film liner. Since the opposing ribs seal the plastic film liner, and the system is continuous, meaning that a second set of ribs seals the plastic film liner before the first set of ribs unseals on its travel back to the top of the transport mechanism, the air that gets ingested into the plastic film liner during the transport process is never allowed to escape. The effect of this is that the plastic film liner fills with air and the system capacity to store waste is reduced, perhaps significantly. To allow this air to escape from the plastic film liner, gaps are left in the conveyer belt ribs such that those ribs do not create a continuous seal. This gap provides a continuous venting of air from the plastic film liner, and with that air, waste odors are also allowed to continuously vent. sTo mitigate continuous odor leakage from this approach in confined spaces such as a small home, an exhaust fan has been implemented thus adding complexity and cost to the system.

This embodiment also solves the problems of toilet height and continuous odor. To solve the problem of system height, the transport mechanism creates a low-profile system of significantly shorter vertical height. The plastic film liner is moved by a partially hollow drum opposed multiple driven rollers that advance and pinch the plastic film liner. Some components described with respect to the first embodiment are applicable to the third embodiment.

Figure 22A:
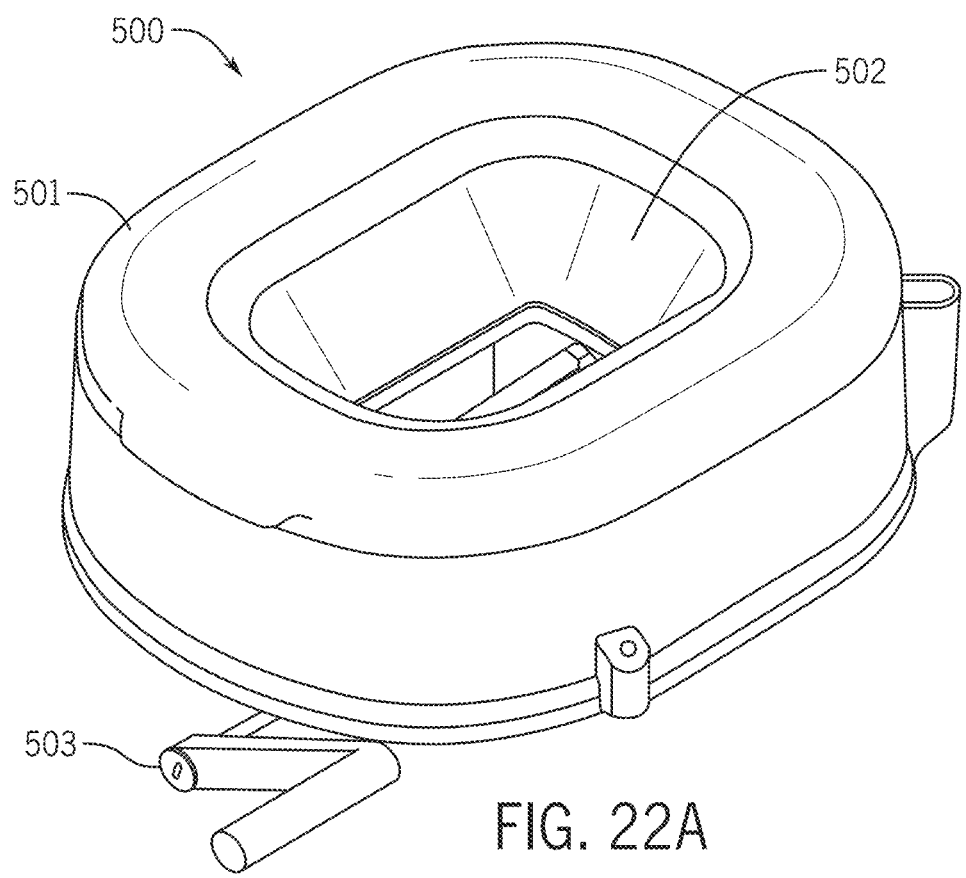
FIGS. 22A and 22B illustrate a third embodiment of a portable toilet.
Figure 22B:
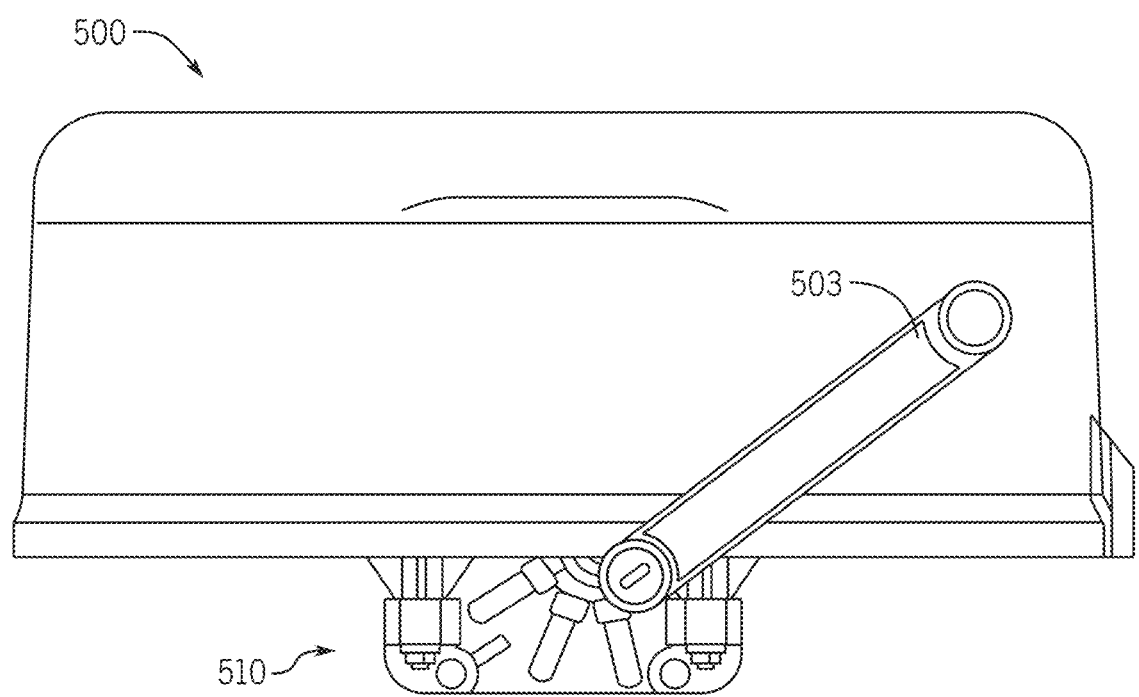

FIGS. 22A and 22B illustrate a third embodiment of a portable toilet 500. The exterior of the portable toilet 500 includes a seat 501, a bowl 502, and a handle 503. Additional, different, or fewer components may be included. The portable toilet 500 is a CBS toilet with a liner. The handle 503 provides a user input to the portable toilet 500 that performs multiple simultaneous or sequential operations to flush the portable toilet 500. The handle 503 causes the liner of the portable toilet 500 to be advanced. The handle 503 causes the liner with deposited material to be deposited into a receptacle. Attached to the portable toiler 500 is a liner transport system 510.

The waste cavity below the toilet 500 may receive and houses the liner after waste has been deposited into the liner. The waste cavity may be detachable from the portable toilet 100.

To solve the issue of system height, the transport mechanism has been designed in a novel manner to create a low-profile system of significantly shorter vertical height. The method of motivation for the plastic film liner is the use of an opposed interlocking transport drum and rollers. The rollers have compliant high friction surfaces. At the most basic level, there is a single drum that when rotated drives a series of smaller rollers positioned around the circumference of the drum.

Figure 23A:
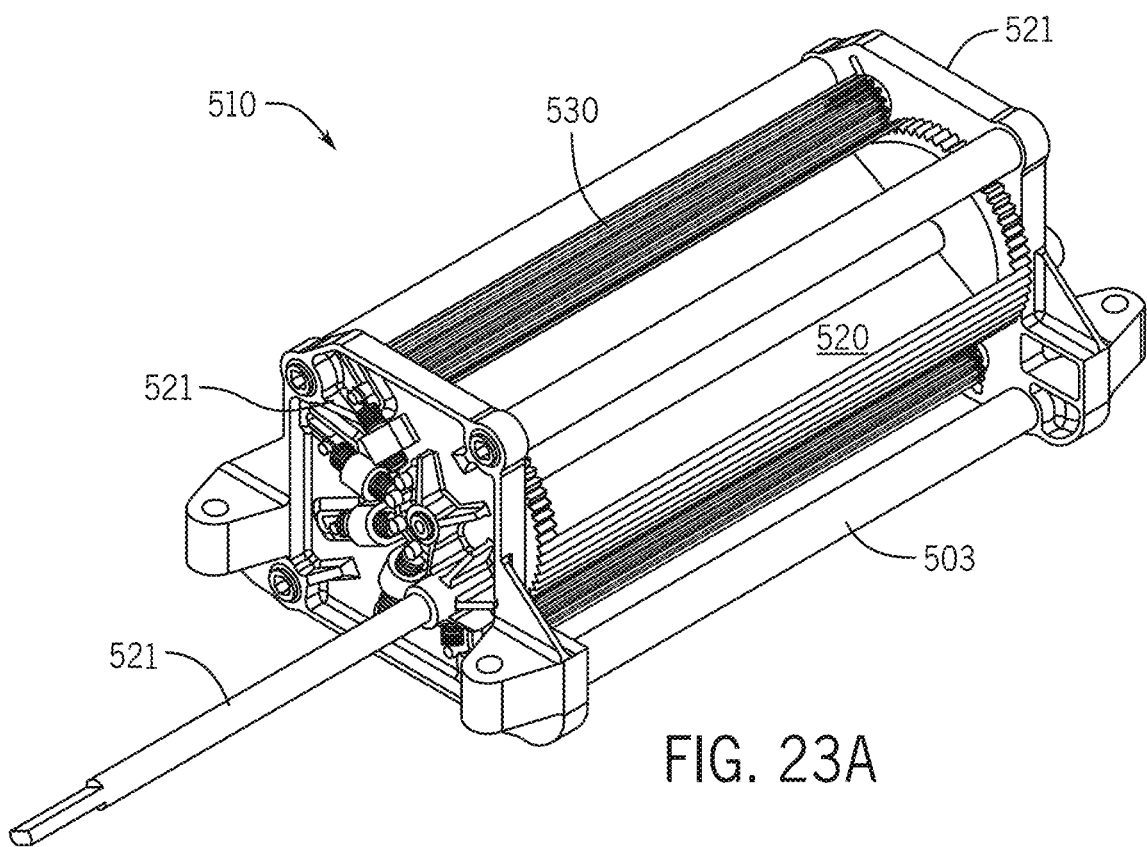
FIGS. 23A and 23B illustrate a liner transport system of the third embodiment of the portable toilet.
Figure 23B:
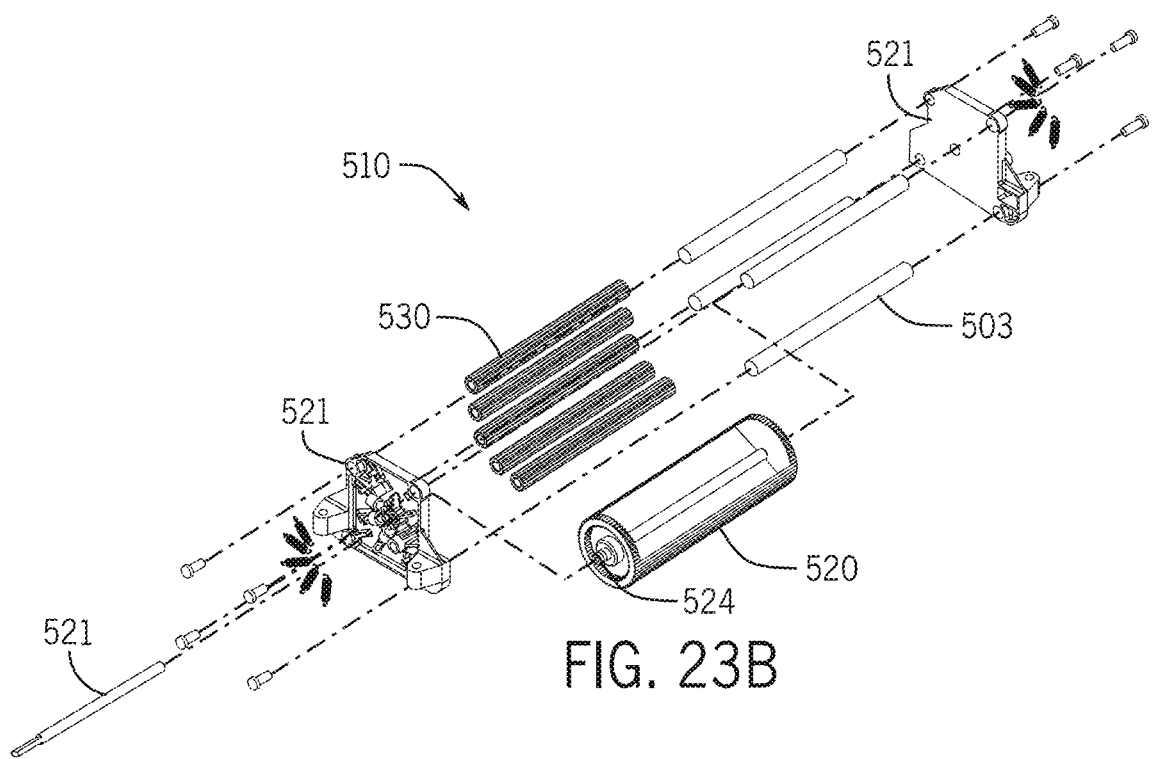

FIGS. 23A and 23B illustrate the liner transport system 510 of the third embodiment of the portable toilet 500. The liner transport system 510 includes a drum 520 and multiple rollers 530 meshed with the drum 520. The drum 520 is supported by a shaft 524. The shaft 524 as well as multiple support shafts 503 are coupled and supported by end plates 521.

The height of the liner transport system 510 may have a height (H) based on the diameter of the transport drums. For example, the height (H) of the liner transport system 510 may be less than a predetermined multiplier (k) times the diameter ($D_{drum}$) of the transport drums 520–$H < k \cdot (D_{drum})$. Examples for k may be 1.5, 2.5, 3, or another value. In one example, the entire height of the transport system (from the bottom of bowl 502 to the top of the waste cavity) may only be 10-20 centimeters.

Figure 24:
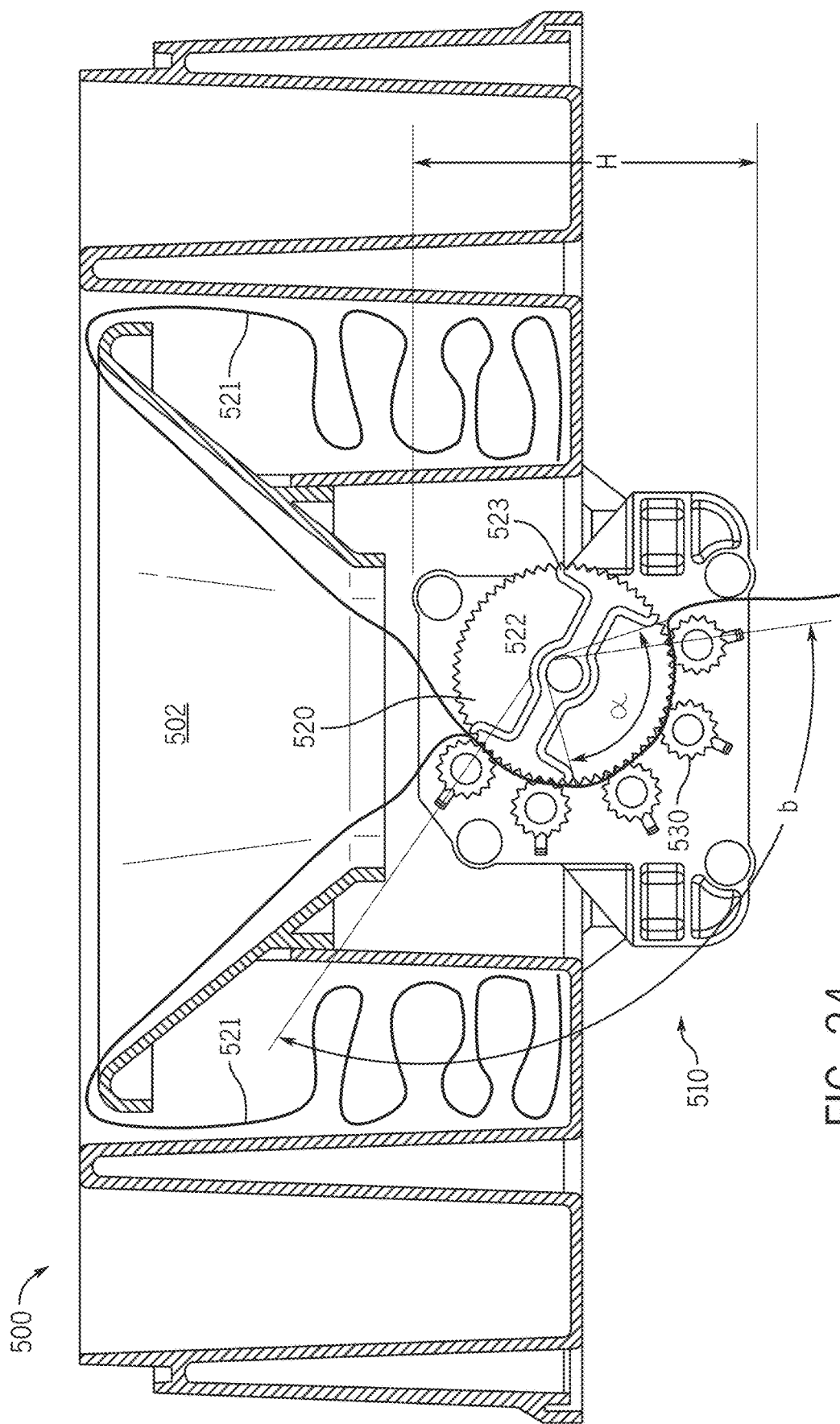
FIG. 24 illustrates the portable toilet assembled with the liner transport system in the third embodiment.

FIG. 24 illustrates the portable toilet 500 assembled with the liner transport system 510 in the third embodiment. The rollers 530 are held in compressive contact to the drum 520. The rollers 530 have a toothed, gear-like profile that meshes with the same profile on the drum 520. The rollers 530 are configured to advance the liner 521 encasing one or more objects deposited in the portable toilet 500.

Figure 25A:
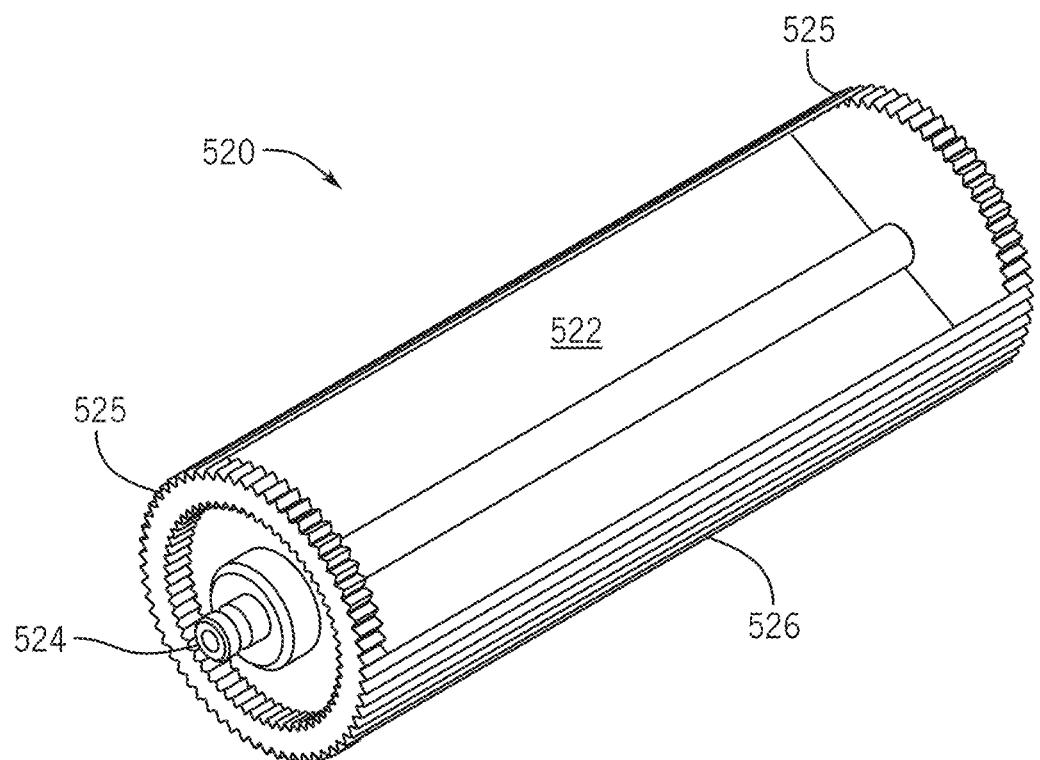
FIG. 25A illustrates an example semi-hollow drum in the liner transport system in the third embodiment.

As shown in both the cross section of FIG. 24 and the perspective view of FIG. 25A, the drum 520 includes a solid portion 523 and at least one hollow portion 522 configured to transport the one or more objects deposited in the portable toilet 500. The hollow portion 522 may be a hollowed, recessed, or concave section of the drum 520 configured to relieve tension in the liner as well as allow waste to pass. As objects are deposited into bowl 502 and the handle 503 is rotated to advance the liner 521, the objects fall into the hollow portion 522 within the drum 520. The hollow portion 522 may be semi cylindrical, making up about half of the drum 520. Other shapes are possible. The drum 520 may include two hollow portions 522, as shown in FIG. 24 that are separated by the solid portions 523.

The relative sizes of the solid portions 523 and the hollow portions 522 may be defined by one or more angle dependent on the arrangement of the rollers 530. As shown in FIG. 24, the plurality of rollers may be arranged along the periphery of the drum 520 spanning a predetermined angle, beta (b). That is, in the direction of rotation of the drum 520, the angle b extends from the center of a farthest clockwise of the rollers 530 to a farthest counterclockwise of the rollers 530. The span of the hollow portions 522 may be dictated by this angle for the roller arrangement. For example, an angle alpha ($\alpha$) may be defined as the angle of the outer circumference portion of the hollow portions 522. The size of the hollow portion 522 may be selected so that angle a is less than angle b so that at least one of the rollers 530 is in full contact with the drum at all times 520. The size of the hollow portion 522 may be selected so that angle a is less than angle b so that at least two of the rollers 530 is in full contact with the drum at all times 520.

When the rollers 530 and drum 520 are assembled together, rotation of the drum 520 motivates the rollers 530 to rotate in cooperation with the drum 520. The plastic film liner 521 is threaded between the rollers 530 and the drum 520 during operation such that the coordinated rotation of the drum 520 and the rollers 530 pulls the plastic film liner 521 and the waste that it contains, downward in a continuous manner while the drum 520 and rollers 530 are rotating.

Figure 25B:
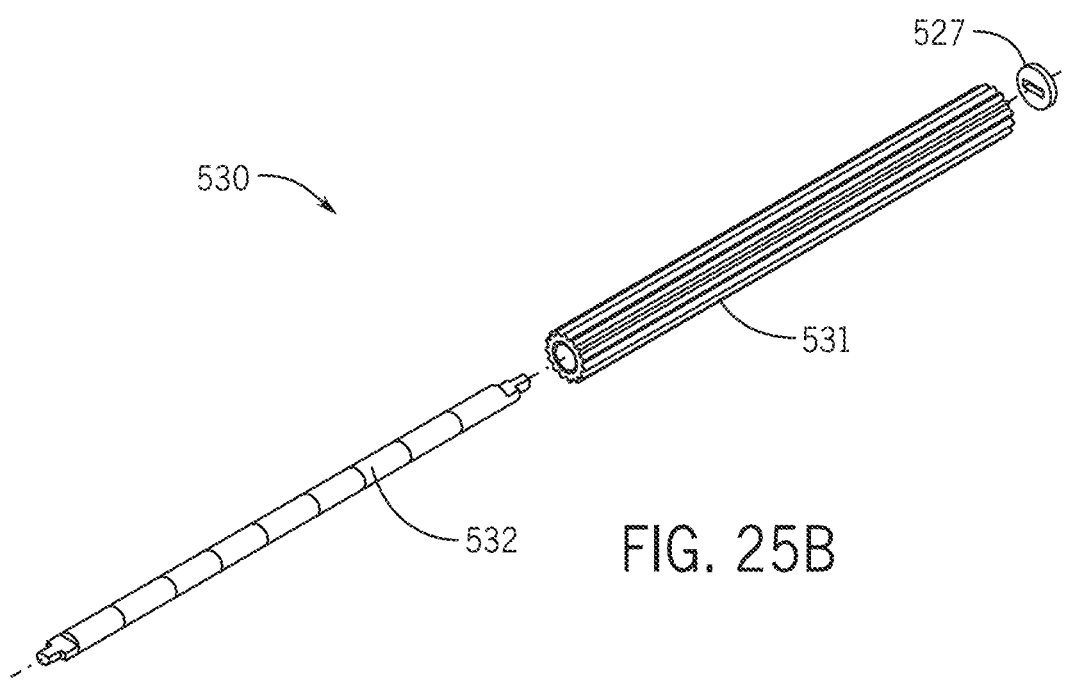
FIG. 25B illustrates an example roller for the liner transport system in the third embodiment.

FIG. 25A illustrates an example semi-hollow drum 520 having hollowed portion 522. For the solid portions 523, the gear teeth 526 extend the full length of the drum 520. Adjacent to the hallowed portion 522, there are also gears 525 near the caps of the drum 520. FIG. 25B illustrates an example roller 530 that include an outer gear 531 and an inner shaft 532, which may be held together by a bearing or cap 527.

Even though the drum 520 includes two alternating longitudinal hollowed out sections on the surface. The ends of the drum 520 are contiguous such that it remains in constant contact with the rollers 530 surrounding it. The drum ends 525 are gears that have toothed profiles that match with the toothed profile of the rollers 530. The drum 520 is driven with the manual crank 503 and when it rotates, the crank 503 drives the rollers 530 to rotate with it. The roller surfaces are fabricated of a high friction material. With the plastic film liner 521 threaded between the drum 520 and rollers 530, the result is the plastic film liner 521 is pulled through the mechanism by the high friction surface. With continued rotation, the plastic film liner 521 encounters the hollow sections of the drum. This allows the waste in the liner 521 to be engulfed within the drum 520 and can be carried through the mechanism at the same rate as the plastic film liner 521.

Figure 26A:
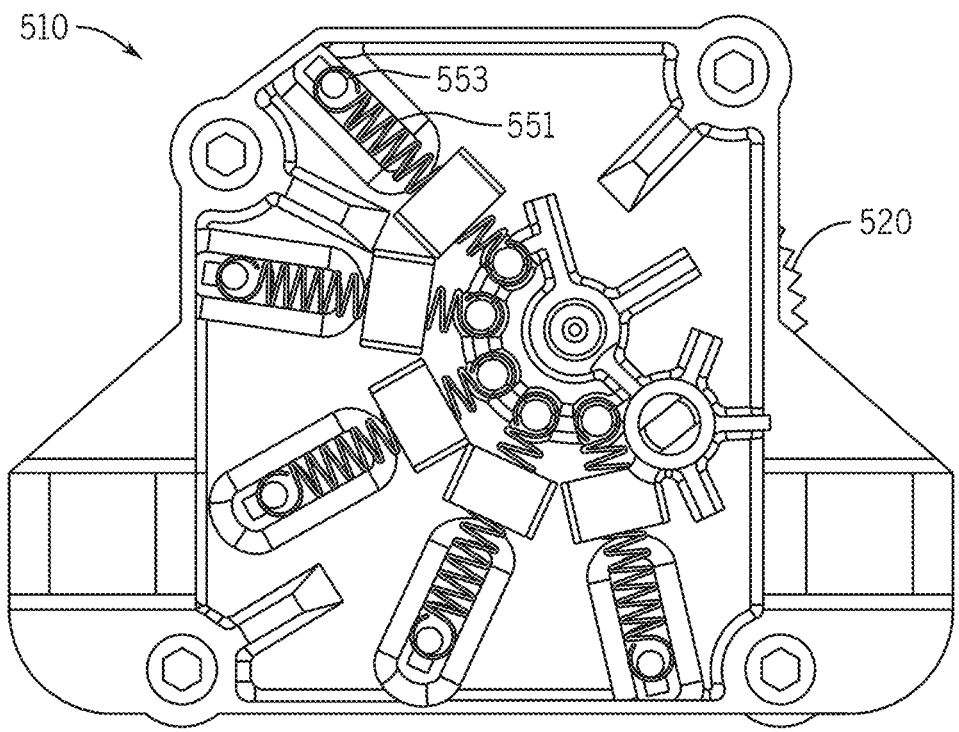
FIGS. 26A and 26B illustrate biasing systems for the roller for the liner transport system in the third embodiment.
Figure 26B:
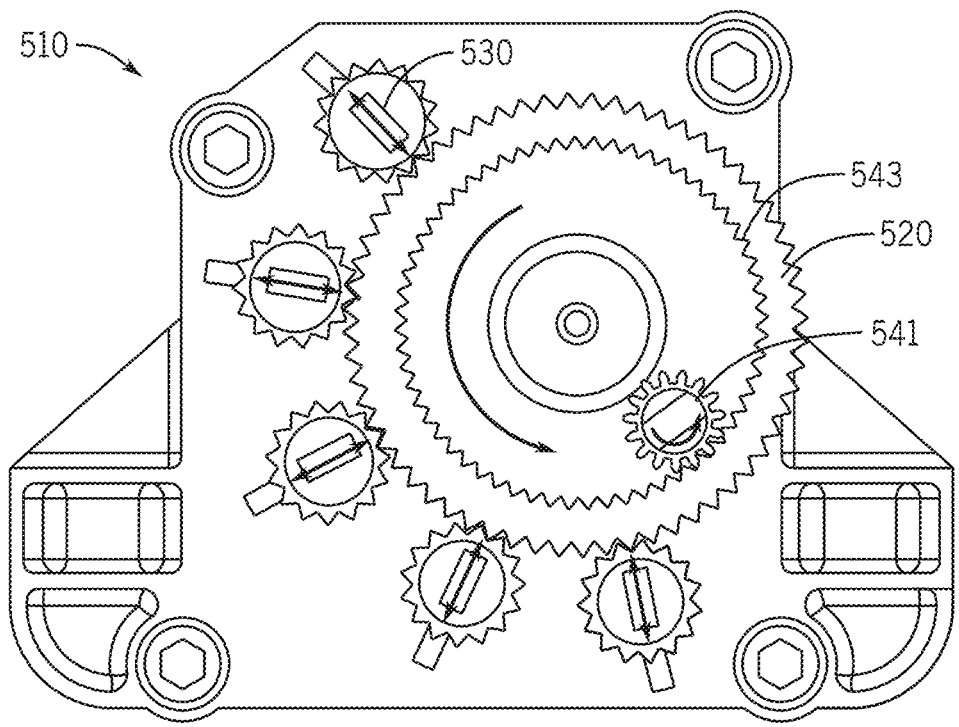

FIGS. 26A and 26B illustrate biasing systems for the roller 530 for the liner transport system 510. The end plate 510 supports both the drum 520 and the rollers 530 in a cooperative relationship to advance the liner 521 while transporting waste within the drum 520. The end plate 510 also includes one or more cavities 551 that hold and support biasing members 553. The biasing members 553 may be springs (e.g., tension springs) that are coupled to the end plate 510 on one end and to respective rollers 530 on the other end. The biasing members 553 bias (apply a force toward) the drum 520. That is, the biasing members 553 push the rollers 530 toward the drum 520. This for serves multiple purposes. It aids in the friction grip on the liner 521. In addition, it allows the rollers 530 to individually retract to allow larger pieces of waste to pass through. That is, in some instances one or more object in the hollow section of the drum 520 may be larger than the hollow section. In this case the biasing members 553 allow one or more of the rollers 530 to retract and provide more space for the liner 521 to pass.

The rollers 530 are held in contact with the drum 520 by spring tension, which keeps a continuous compressive force between the drum 520 and rollers 530 and allows the rollers 530 to displace away from the surface of the drum 520 to allow rigid material to flow through the mechanism without causing damage or excessive stress.

FIG. 26B also illustrates the drive train. Through rotation of handle 503 a driven gear 541 rotates. The driven gear is much smaller than the radius of the handle 503, which provides as high torque. The driven gear 541 meshes with an inwardly face gear 543 of the drum 520. The driven gear 541, when rotated by the handle 503, causes the drum 520 to rotate. The drum 520 rotates the rollers 530 and advances the liner 521.

Figure 27:
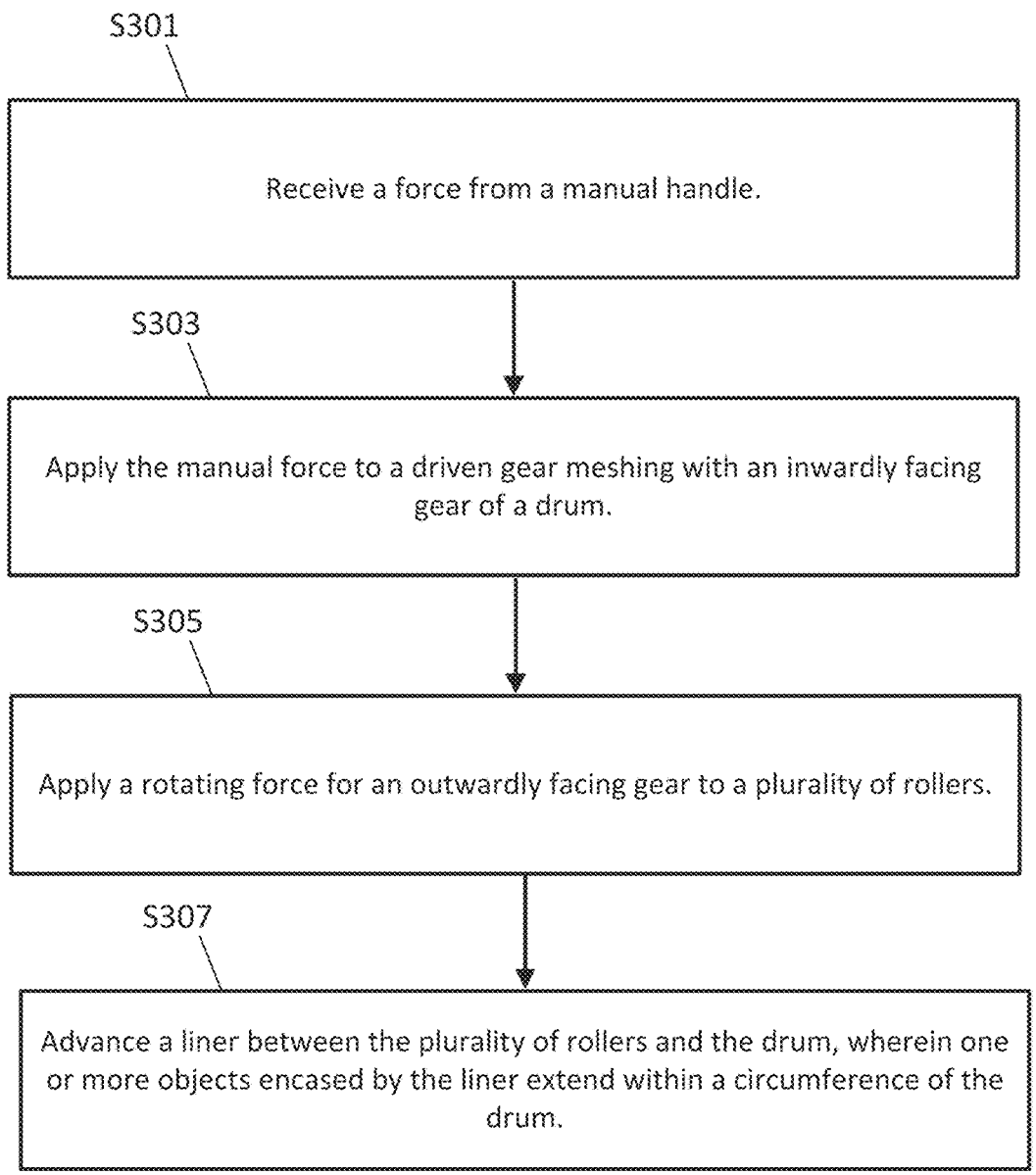
FIG. 27 illustrates a flowchart for the liner transport system in the third embodiment.

FIG. 27 illustrates a flowchart for the liner transport system 510 in the third embodiment. Additional, different, or fewer acts may be performed.

At act S301, a user may apply a force to a manual handle or crank. Thus, the liner transport system 510 receives a force from the manual handle or crank. Alternatively, a motorized system may be used. In this example, the user may push a button which causes motor powered by a patter to rotate a shaft in place of the manual handle or crank.

At act S303, the liner transport system 510 applies the manual force to a driven gear meshing with an inwardly facing gear of a drum. The driven gear may be a stationary gear that causes the drum to rotate around the stationary gear. Alternatively, the driven gear may be a planetary gear.

At act S305, the liner transport system 510 applies a rotating force for an outwardly facing gear to the plurality of rollers. The drum includes at least one section where the rollers and the drum are meshed together across the full length or substantially all of the length of the drum and rollers. The drum includes at least one section where the rollers and the drum are meshed together only in a small section. The small section may be less than 10% of the full length of the drum and rollers. In one example, the small section may be a gear near the end cap, or both end caps, of the roller. Between the end caps there is an open space which reveals a waste carrying chamber inside of the drum.

At act S306, the liner transport system 510 advances a liner between the rollers and the drum. Inside the liner is waste that has been deposited into the toilet. One or more waste objects held or encased by the liner extend into the waste carrying chamber of the drum. That is, the waste objects may be at least partially located within a circumference of the drum. The waste in deposited in the plastic film lined toilet bowl. As the drum and rollers rotate, the waste and plastic film liner is transported through the mechanism until the waste and plastic film liner are ejected from the bottom side of the mechanism and into a collection container.

By eliminating the belts wrapping around the upper and lower drums, and replacing that belt function with high friction surfaces on the small diameter rollers, the space top to bottom of the transport mechanism can be reduced, saving that space as well as the space consumed by the belt itself and reducing the height of the assembly.

The rotation of the drum is coordinated with the rollers such that as the high friction surface on some of the rollers is mostly without contact of the drum surface due to the encountering of the hollowed section of the drum, other rollers are in full contact with the drum surface. The coordinated condition of some rollers being out of substantial contact with the drum surface while other rollers are in contact with the drum surface results in an operating condition such that at least two rollers are always in full contact with the drum surface. This ensures that the plastic film liner is always being transported through the transport mechanism with the drum is being rotated. In addition to this drum having full length contact with at least two of the rollers at any point also ensures that there is adequate amount of seal maintained by the compression of liner in that region aided by the spring force acting on rollers. This helps in containing the odor to the delivery side of the transport mechanism.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

We claim:

1. An apparatus for a portable toilet, the apparatus comprising:
   a film storage compartment configured to store a liner having a tubular shape; and
   a plurality of transport wheels configured to transport the liner through a serpentine space,
   wherein the plurality of transport wheels includes a left upper transport wheel, a left lower transport wheel, a right upper transport wheel, and a right lower transport wheel,
   wherein each of the plurality of transport wheels includes a high friction area and a hollow area, wherein the high friction area of the left upper transport wheel contacts the liner at the same time the high friction area of the right upper transport wheel contacts the liner.

2. The apparatus of claim 1, wherein the high friction area advances the liner through the serpentine space.

3. The apparatus of claim 1, wherein the hollow area provides a space for waste as the liner advances through the serpentine space.

4. The apparatus of claim 1, wherein at least one of the plurality of transport wheels includes at least one high friction area and at least two separated hollow areas.

5. The apparatus of claim 1, further comprising:
   a handle coupled to drive at least one of the plurality of transport wheels.

6. The apparatus of claim 1, further comprising:
   a spring to bias the left upper transport wheel and the right upper transport wheel together or the left lower transport wheel and the right lower transport wheel together.

7. The apparatus of claim 1, wherein the high friction area of the left lower transport wheel contacts the liner at the same time the high friction area of the right lower transport wheel contacts the liner.

8. The apparatus of claim 1, wherein the high friction area of the left lower transport wheel contacts the liner at a different time that the high friction area of the left upper transport wheel contacts the liner.

9. The apparatus of claim 1, further comprising:
   an end plate including a slot, wherein the slot guides at least one of the plurality of transport wheels to separate from the liner.

10. The apparatus of claim 1, wherein the left upper transport wheel and the left lower transport wheel are meshed with a left pinion gear, and the right upper transport wheel and the right lower transport wheel are meshed with a right pinion gear.

11. The apparatus of claim 10, wherein at least one of the left upper transport wheel and the right upper transport wheel are movable along a first path or at least one of the left lower transport wheel and the right lower transport wheel are movable along a second path.

12. The apparatus of claim 11, wherein the first path or the second path is curved.

13. The apparatus of claim 11, wherein the first path is concentric with the left pinon gear or the second path is concentric with the right pinion gear.

14. An apparatus for a portable toilet, the apparatus comprising:
   a seat;
   a film storage compartment positioned under the seat and configured to store a liner having a tubular shape; and
   a plurality of transport wheels positioned under the seat configured to transport the liner through a serpentine space, wherein the plurality of transport wheels includes a left upper transport wheel, a left lower transport wheel, a right upper transport wheel, and a right lower transport wheel,
   wherein at least the left upper transport wheel and the right upper transport wheel includes a drum with a high friction area and a hollow area,
   wherein the high friction area of the left upper transport wheel contacts the liner at the same time the high friction area of the right upper transport wheel contacts the liner.

15. The apparatus of claim 14, wherein the hollow area is recessed into the drum.

16. The apparatus of claim 14, further comprising:
   a handle coupled to drive at least one of the plurality of transport wheels.

17. The apparatus of claim 14, further comprising:
   a spring to bias the left upper transport wheel and the right upper transport wheel together or the left lower transport wheel and the right lower transport wheel together.

18. The apparatus of claim 14, wherein at least one of the plurality of transport wheels includes at least one high friction area and at least two separated hollow areas.

19. A toilet comprising:
   a seat;
   a bowl;
   a liner pinching system;
   a plurality of transport wheels positioned under the seat configured to transport a liner through a serpentine space, wherein the plurality of transport wheels includes a left upper transport wheel, a left lower transport wheel, a right upper transport wheel, and a right lower transport wheel,
   wherein at least one of the plurality of transport wheels includes a drum with a high friction area and a hollow area.

20. The toilet of claim 19, wherein the at least one of the plurality of transport wheels includes at least one high friction area and at least two separated hollow areas.

21. The toilet of claim 19, further comprising:
   a handle coupled to drive the at least one of the plurality of transport wheels.

22. The toilet of claim 19, further comprising:
a spring to bias the left upper transport wheel and the right upper transport wheel together or the left lower transport wheel and the right lower transport wheel together.

\* \* \* \* \*

UNITED STATES PATENT AND TRADEMARK OFFICE
CERTIFICATE OF CORRECTION

| | |
|---|---|
| PATENT NO. | : 11,974,703 B2 |
| APPLICATION NO. | : 17/121334 |
| DATED | : May 7, 2024 |
| INVENTOR(S) | : Michael Luettgen et al. |

It is certified that error appears in the above-identified patent and that said Letters Patent is hereby corrected as shown below:

In the Claims

Claim 15, Column 18, Line 37, "area is" should be replaced with -- areas are --

Signed and Sealed this
Thirteenth Day of August, 2024

Katherine Kelly Vidal
*Director of the United States Patent and Trademark Office*